(12) United States Patent
Nyuugaku

(10) Patent No.: US 12,371,447 B2
(45) Date of Patent: Jul. 29, 2025

(54) METHOD FOR PRODUCING (METH)ACRYLOXY GROUP-CONTAINING ORGANOSILICON COMPOUNDS

(71) Applicant: Shin-Etsu Chemical Co., Ltd., Tokyo (JP)

(72) Inventor: Takeshi Nyuugaku, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 389 days.

(21) Appl. No.: 17/963,549

(22) Filed: Oct. 11, 2022

(65) Prior Publication Data

US 2023/0134471 A1      May 4, 2023

(30) Foreign Application Priority Data

Oct. 28, 2021    (JP) .................................. 2021-176459

(51) Int. Cl.
*C07F 7/14*            (2006.01)

(52) U.S. Cl.
CPC ........................................ *C07F 7/14* (2013.01)

(58) Field of Classification Search
CPC ........................................................ C07F 7/14
See application file for complete search history.

(56) References Cited

FOREIGN PATENT DOCUMENTS

JP            11-29583 A      2/1999

*Primary Examiner* — Sikarl A Witherspoon
(74) *Attorney, Agent, or Firm* — Birch, Stewart, Kolasch & Birch, LLP

(57) ABSTRACT

An acryloxy or methacryloxy group-containing organosilicon compound of the formula

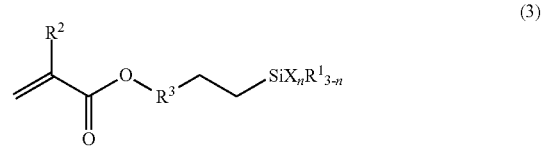

(3)

(wherein $R^1$ is a substituted or unsubstituted monovalent hydrocarbon group of 1 to 10 carbon atoms, $R^2$ is a hydrogen atom or a methyl group, $R^3$ is an unsubstituted divalent hydrocarbon group of 1 to 18 carbon atoms, X is a halogen atom and n is an integer of 1, 2 or 3) is to prepared by subjecting a hydrohalosilane compound of the formula $$HSiX_nR^1_{3-n} \quad (1)$$

and an alkenyl group-containing (meth)acrylate compound of the formula

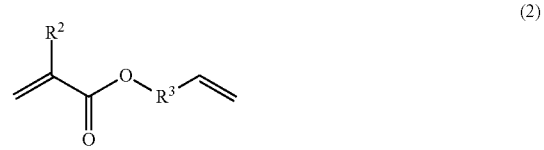

(2)

to a hydrosilylation reaction in the presence of an acid amide compound and a platinum catalyst. This method is able to suppress, in the industrial scale production of (meth)acryloyloxy group-containing organosilicon compounds, propagation reactions by which the starting (meth)acrylate compound self-polymerizes.

7 Claims, No Drawings

METHOD FOR PRODUCING (METH)ACRYLOXY GROUP-CONTAINING ORGANOSILICON COMPOUNDS

CROSS-REFERENCE TO RELATED APPLICATION

This non-provisional application claims priority under 35 U.S.C, § 119(a) on Patent Application No. 2021-176459 filed in Japan on Oct. 28, 2021, the entire contents of which are hereby incorporated by reference.

TECHNICAL FIELD

The present invention relates to a method for producing (meth)acryloxy group-containing organosilicon compounds.

BACKGROUND ART

Organosilicon compounds having a hydrolyzable silyl group and an organic group make it possible to join together organic materials and inorganic materials which are generally difficult to unite, owing to the fact that a silanol group generated by hydrolysis of the hydrolyzable silyl group forms a covalent bond with a hydroxyl group on the surface of the inorganic material and the organic group reacts with the organic material. This enables properties such as heat resistance, water resistance, weather resistance, increased mechanical strength, adhesion, dispersibility, water repellency and rust inhibition to be imparted to organic/inorganic composite materials.

Utilizing these properties, such organosilicon compounds may be employed in a broad range of fields and applications, including silane coupling agents, resin additives, surfactants, textile finishes, adhesives, paint additives and polymer modifiers.

Among such organosilicon compounds, those having an acryloyloxy or tnethacryloyloxy group (referred to collectively below as "(meth)acryloyloxy group"), given that the (meth)acryloyloxy group, which is a polymerizable functional group, copolymerizes with various radical polymerizable monomers, are useful as radical polymerizable monomers for obtaining silicon-containing polymers.

Examples of such (meth)acryloyloxy group-containing organosilicon compounds include 3-acryloyloxypropyltrichlorosilane and 3-methacryloyloxypropyltrichlorosilane (see JP-A H11-29583).

The above (meth)acryloyloxy group-containing organosilicon compound is generally synthesized by subjecting a hydrohalosilane compound and an alkenyl group-containing acrylate or methacrylate compound (referred to collectively below as "(meth)acrylate compound") to a hydrosilylation reaction in the presence of a platinum catalyst.

SUMMARY OF THE INVENTION

However, the polymerizable functional group that characterizes the (meth)acryloyloxy group-containing organosilicon compounds of JP-A H11-29583 readily self-polymerize, giving rise to various problems when such compounds are produced on an industrial scale. Specifically, the polymerizable functional group reacts with a free radical generated by heat during production, forming a new free radical (initiation reaction), The is reaction between the polymerizable functional group and the free radical is an exothermic reaction. As the temperature rises due to the reaction, other polymerizable functional groups and new free radicals react serially and at an increasing rate, leading to self-polymerization (propagation reaction). When the temperature rises abruptly due to self-polymerization and control of the reaction becomes impossible, the reaction mixture undergoes vaporization, thermal decomposition and the like, generating flammable gases. In the worst-case scenario, there is a danger of an accident such as a fire or explosion occurring (runaway reaction). Also, the polymer may clog the interior of the apparatus or piping, giving rise to problems such as major damage to the production process.

For such reasons, to facilitate production of the above organosilicon compound on an industrial scale, it is very important to establish a method for suppressing self-polymerization.

The reactivity between the radical polymerizable monomer and the free radicals strongly influences the structure of the radical polymerizable monomer.

In production of the above (meth)acryloyloxy group-containing organosilicon compound, the (meth)acrylate compound serving as a starting material and the (meth)acryloyloxy group-containing organosilicon compound obtained as the reaction product contain a (meth)acryloyloxy group, which has a very large radical propagation rate constant, and so the initiation reaction proceeds rapidly.

However, in the (meth)acryloyloxy group-containing organosilicon compound obtained as the reaction product, free radicals are stabilized by the substituent effect of silyl groups having a large steric hindrance; hence, the propagation reaction is slow and is not a direct cause of self-polymerization. On the other hand, in the starting (meth)acrylate compound, steric hindrance by the alkenyl group is small and the propagation reaction proceeds rapidly, serving as a direct cause of self-polymerization.

Given the above, in order to easily produce the above (meth)acryloyloxy group-containing organosilicon compound on an industrial scale, it is very important to establish a method for suppressing self-polymerization of the polymerizable functional to group. Specifically, it is very important to establish a method for suppressing the propagation reaction of the starting (meth)acrylate compound.

Known methods for suppressing self-polymerization of the polymerizable functional group include methods involving the addition of various polymerization inhibitors.

Polymerization inhibitors that are known to be capable of suppressing the propagation reaction of the starting (meth)acrylate compound include phenolic polymerization inhibitors.

Polymerization inhibitors that are known to be capable of suppressing the propagation reaction of the (meth)acryloyloxy group-containing organosilicon compound obtained as the product include phenolic polymerization inhibitors and hindered phenolic polymerization inhibitors.

Because hydroxyl group-containing phenolic polymerization inhibitors such as 4-methoxyphenol, in the production of a (meth)acryloyloxy group-containing organosilicon compound, have within the reaction system the highest reactivity with the free radical, they rapidly trap the radicals that are generated and can thereby suppress both the initiation reaction and the propagation reaction. However, in the presence of a halosilane compound, the hydroxyl groups gradually react with the halosilane compound, as a result of which the ability to trap radicals with hydroxyl groups is lost and the polymerization inhibitor ceases to function as an inhibitor.

In the case of hindered phenolic polymerization inhibitors having substituents with a large steric hindrance around the hydroxyl group, such as 2,6-di-tert-butyl-4-methylphenol, due to the influence of the substituents having a large steric hindrance, the hydroxyl group substantially does not react with halosilane compounds. However, because this hindered phenolic polymerization inhibitor has a moderate degree of reactivity with free radicals, the generated radicals cannot be rapidly trapped and so the initiation reaction cannot be suppressed. Also, when the initiation reaction begins, the free radicals react serially and at an increasing rate. At this time, because the reactivity between the hindered phenolic polymerization inhibitor and the free radicals is higher than the reactivity between the organosilicon compound obtained as the product and the free radicals but is lower than the reactivity between the starting (meth)acrylate compound and the free radicals, the propagation reaction of the starting (meth)acrylate compound cannot be suppressed.

For the above reasons, the starting (meth)acrylate compound propagation reaction-suppressing effect of the various above polymerization inhibitors in the presence to of halosilane compounds is inadequate.

Hence, there exists a desire for the development of a method which, when producing a (meth)acryloyloxy group-containing organosilicon compound on an industrial scale, can suppress the propagation reaction of the starting (meth)acrylate compound.

It is therefore the object of this invention to provide a method for the production of (meth)acryloyloxy group-containing organosilicon compounds which, in cases where a (meth)acryloyloxy group-containing organosilicon compound is produced on an industrial scale, can suppress the propagation reaction by which the starting (meth)acrylate compound self-polymerizes.

As a result of intensive investigations, we have discovered that when a. hydrohalosilane compound and an alkenyl group-containing (meth)acrylate compound are subjected to a hydrosilylation reaction in the presence of an acid amide compound and a platinum catalyst, the propagation reaction of the starting (meth)acrylate compound can be suppressed.

Accordingly, the invention provides a method for preparing an acryloxy or methacryloxy group-containing organosilicon compound of general formula (3) below

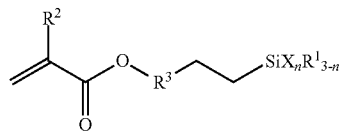

(3)

(wherein $R^1$ is a substituted or unsubstituted monovalent hydrocarbon group of 1 to 10 carbon atoms, $R^2$ is a hydrogen atom or a methyl group, $R^3$ is an unsubstituted divalent hydrocarbon group of 1 to 18 carbon atoms, X is a halogen atom and n is an integer of 1, 2 or 3), which method includes the step of subjecting a hydrohalosilane compound of general formula (1) below $$HSiX_nR^1_{3-n} \qquad (1)$$

(wherein $R^1$, X and n are as defined above) and an alkenyl group-containing (meth)acrylate compound of general formula (2) below

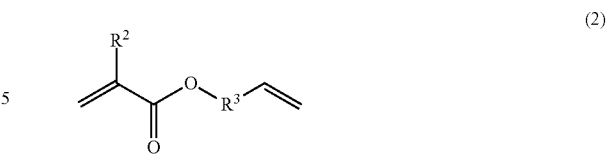

(2)

(wherein $R^2$ and $R^3$ are as defined above) to a hydrosilylation reaction in the presence of an acid amide compound and a platinum catalyst.

In a preferred embodiment of the organosilicon compound preparation method of the invention, the acid amide compound is an acid amide compound of general formula (4) below $$R^4-[C(=O)-NR^5]_k \qquad (4)$$

(wherein $R^4$ is a hydrogen atom or a substituted or unsubstituted k-valent hydrocarbon group of 1 to 30 carbon atoms, each $R^5$ is independently a hydrogen atom or a substituted or unsubstituted monovalent hydrocarbon group of 1 to 30 carbon atoms, and k is the integer 1 or 2) or a primary acid amide compound of general formula (5) below $$R^6-C(=O)-NH_2 \qquad (5)$$

(wherein $R^6$ is a hydrogen atom or a substituted or unsubstituted monovalent hydrocarbon group of 1 to 30 carbon atoms).

In another preferred embodiment of the preparation method of the invention, the acid amide compound is one or more selected from the group consisting of acetamide. N-methylacetamide, N,N-dimethylacetamide, malonamide, succinamide, maleamide, fumaramide, benzamide, propionamide, hutyramide, palmitamide, stearamide, oleamide and erucamide.

In yet another preferred embodiment, the hydrosilylation reaction is carried out in the presence of a polymerization inhibitor.

In still another preferred embodiment, the polymerization inhibitor is a phenolic polymerization inhibitor or a hindered phenolic polymerization inhibitor. The phenolic polymerization inhibitor is preferably one or more selected from the group consisting of 4-methoxyphenol, 2-methyl-4-methoxyphenol, 2-tert-butyl-4-methoxyphenol and 4-hydroxyphenol. The hindered phenolic polymerization inhibitor is preferably one or more to selected from the group consisting of 2,6-di-tert-butyl-4-methylphenol, 4,4-methylenebis(2,6-di-tert-butylphenol), 2,2-methylenebis(6-tert-butyl-4-methylphenol), 2,6-di-tert-butyl-4-dimethylaminomethylphenol, 2,6-di-teat-butyl-4-methoxyphenol, 2,6-di-tert-butyl-4-hydroxyphenol and 3,4-dihydro-2,5,7,8-tetramethyl-2-(4,8,12-trimethytridecy)-2H-1-benzopyran-6-ol.

ADVANTAGEOUS EFFECTS OF THE INVENTION

The preparation method of the invention is able, through the use of an acid amide compound, to suppress the propagation reaction of the starting (meth)acrylate compound in the presence of a hydrohalosilane compound. In addition, when the hydrosilylation reaction is carried out in the presence of a polymerization inhibitor, owing to synergism between the acid amide compound and the polymerization inhibitor, higher effects can be achieved than when either compound is used alone.

DESCRIPTION OF THE EMBODIMENTS

The objects, features and advantages of the invention will become more apparent from the following detailed description, In this invention, a (meth)acryloxy group-containing organosilicon compound of general formula (3) below (referred to below as "Compound (3)") is prepared by subjecting a hydrohalosilane compound of general formula (1) below ("Compound (1)") and an alkenyl group-containing (meth)acrylate compound of general formula (2) below ("Compound (2)") to a hydrosilylation reaction in the presence of an acid amide compound and a platinum catalyst.

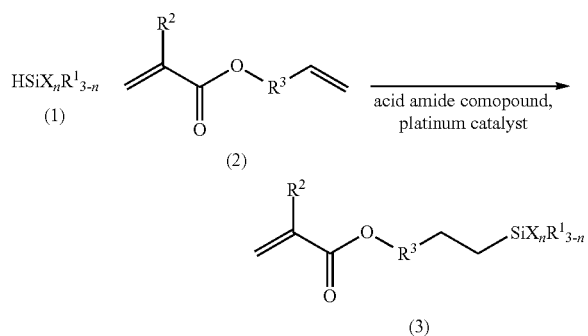

In general formula (1) above, $R^1$ is a substituted or unsubstituted monovalent hydrocarbon group of 1 to 10 carbon atoms, preferably 1 to 6 carbon atoms, more preferably 1 to 3 carbon atoms, and even more preferably 1 or 2 carbon atoms.

The monovalent hydrocarbon group may be linear, branched or cyclic. Specific examples include linear alkyl groups such as methyl, ethyl, n-propyl, n-butyl, n-pentyl, n-hexyl, n-heptyl, n-octyl, n-nonyl and n-decyl groups; branched alkyl groups such as sec-propyl, sec-butyl, tert-butyl, sec-pentyl, tert-pentyl, sec-hexyl, tert-hexyl, sec-heptyl, tert-heptyl, sec-octyl, tert-octyl, sec-nonyl, tert-nonyl, sec-decyl and tert-decyl groups; cyclic alkyl groups such as cyclopentyl and cyclohexyl groups; alkenyl groups such as vinyl, allyl, butenyl and methally groups; aryl groups such as phenyl, tolyl and xylyl groups; and aralkyl groups such as benzyl and phenethyl groups.

Of these, $R^1$ is preferably an unsubstituted linear alkyl group of 1 to 3 carbon atoms. Particularly from the standpoint of availability, a methyl group or an ethyl group is more preferred.

Some or all of the hydrogen atoms on these monovalent hydrocarbon groups may be substituted with other substituents. Specific examples of these substituents include alkoxy groups of 1 to 3 carbon atoms, such as methoxy, ethoxy and (iso)propoxy groups; halogen atoms such as fluorine, chlorine and bromine atoms; aromatic hydrocarbon groups such as the phenyl group; and also cyano groups, amino groups, ester groups, ether groups, carbonyl groups, acyl groups and sulfide groups. One of these substituents may be used alone or two or more may be used in combination. There is no particular limitation on the substitution sites for these substituents: the number of substituents also is not limited.

In general formula (1), X represents a halogen atom. Examples of the halogen atom include fluorine, chlorine, bromine and iodine atoms. From the standpoint of availability, chlorine and bromine atoms are preferred.

Also, the substituent 'n' is an integer of 1, 2 or 3. Particularly in cases where the hydrohalosilane compound is used as a silane coupling agent, to increase adhesion by reacting the compound with a plurality of hydroxyl groups on the substrate surface, n is preferably 2 or 3.

Specific examples of Compound (1) include fluorosilane compounds such as trifluorosilane, difluoromethylsilane, fluorodimethylsilane, difluoroethylsilane, fluorodiethylsilane, difluoropropylsilane, fluorodipropylsilane, difluorophenylsilane and fluorodiphenylsilane; chlorosilane compounds such as trichlorosilane, dichloromethylsilane, chlorodimethylsilane, dichloroethylsilane, chlorodiethylsilane, dichloropropylsilane, chlorodipropylsilane, dichlorophenylsilane and chlorodiphenylsilane; bromosilane compounds such as tribromosilane, dibromomethylsilane, bromodimethylsilane, dibromoethylsilane, bromodiethylsilane, dibromopropylsilane, bromodipropylsilane, dibromophenylsilane and bromodiphenylsilane; and iodosilane compounds such as triiodosilane, diiodomethylsilane, iododimethylsilane, diiodoethylsilane, iododiethylsilane, diiodopropylsilane, iododipropylsilane, diiodophenylsilane and iododiphenylsilane.

Of these, particularly from the standpoint of availability, trichlorosilane, dichloromethylsilane, chlorodimethylsilane, dichloroethylsilane and chlorodiethylsilane are preferred.

In general formula (2), $R^2$ is a hydrogen atom or a methyl group, and $R^3$ is an unsubstituted divalent hydrocarbon group of 1 to 18 carbon atoms, preferably 1 to 14 carbon atoms, more preferably 1 to 8 carbon atoms, and even more preferably 1 to 6 carbon atoms.

The divalent hydrocarbon group may be linear, branched or cyclic. Specific examples include linear alkylene groups such as methylene, ethylene, trimethylene, tetramethylene, pentamethylene, hexamethylene, heptamethylene, octamethylene, nonamethylene, decylene, undecylene, dodecylene, tridecylene, tetradecylene, pentadecylene, hexadecylene, heptadecylene and octadecylene groups; branched alkylene groups such as sec-propylene, sec-butylene, tert-butylene, sec-pentylene, tert-pentylene, sec-hexylene, tert-hexylene, sec-heptylene, tert-heptylene, sec-octylene, tert-octylene, sec-nonylene, tert-nonylene, sec-decylene, tert-decvlene, sec-undecylene, tert-undecylene, sec-dodecylene, tert-dodecylene, sec-tridecylene, tert-tridecylene, sec-tetradecylene, tert-tetradecylene, sec-pentadecylene, tert-pentadecylene, sec-hexadecylene, tert-hexadecylene, sec-heptadecylene, test-heptadecylene, sec-octadecyiene and tert-octadecylene groups and cyclic alkylene groups such as cyclopropylene, cyclopentylene and cyclohexylene groups.

Of these, $R^2$ is preferably an unsubstituted linear alkylene group of 1 to 8 carbon atoms. Particularly from the standpoint of the availability, unsubstituted linear alkylene groups of 1 to 6 carbon atoms such as methylene and ethylene groups are more preferred.

Specific examples of Compound (2) include (meth)acrylate compounds such as allyl(meth)acrylate, 3-butenyl (meth)acrylate, 4-pentenyl(meth)acrylate, 5-hexenyl(meth) acrylate, 6-hepenyl(meth)acrylate, 7-octenyl(meth)acrylate, 8-nonenyl(meth)acrylate, 9-decenyl(meth)acrylate, 10-undecenyl(meth)acrylate, 11-dodecenyl(meth)acrylate, 12-tridecenyl(meth)acrylate, 13-tetradecenyl(meth)acrylate, 14-pentadecenyl(meth)acrylate, 15-hexadecenyl(meth)acrylate, 16-heptadecenyl(meth)acrylate, 17-octadecenyl(meth) acrylate, 18-nonadecenyl(meth)acrylate and 19-icosenyl (meth)acrylate.

Of these, particularly from the standpoint of availability, allyl(meth)acrylate, 3-butenyl(meth)acrylate, 4-pentenyl (meth)acrylate, 5-hexenyl(meth)acrylate, 6-heptenyl(meth) acrylate and 7-octenyl(meth)acrylate are preferred.

In general formula (3), $R^1$, $R^2$, $R^3$, X and n are the same as in general formula (1) and general formula (2).

Specific examples of Compound (3) include fluorosilane compounds such as 3-(meth)acryloxypropyltrifluorosilane, 3-(meth)acryloxypropyldifluoromethylsilane, 3-(meth)acryloxypropylfluorodimethylsilane, 4-(meth)acryloxybutyltrifluorosilane, 4-(meth)acryloxybutyldifluoromethylsilane, 4-(meth)acryloxybutylfluorodimethylsilane, 5-(meth)acryloxypentyltrifluorosilane, 5-(meth)acryloxypentyldifluoromethylsilane, 5-(meth)acryloxypentylfluorodimethylsilane, 6-(meth)acryloxyhexyltrifluorosilane, 6-(meth)acryloxyhexyldifluoromethylsilane, 6-(meth)acryloxyhexylfluorodimethylsilane, 7-(meth)acryloxyheptyltrifluorosilane, 7-(meth)acryloxyheptyldifluoromethylsilane, 7-(meth)acryloxyheptylfluorodimethylsilane, 8-(meth)acryloxyoctyltrifluorosilane, 8-(meth)acryloxyoctyldifluoromethylsilane, 8-(meth)acryloxyoctylfluorodimethylsilane, 9-(meth)acryloxynonyltrifluorosilane, 9-(meth)acryloxynonyldifluoromethylsilane, 9-(meth)acryloxynonylfluorodimethylsilane, 10-(meth)acryloxydecyltrifluorosilane, 10-(meth)acryloxydecyldifluoromethylsilane,10-(meth)acryloxydecylfluorodimethylsilane, 11-(meth)acryloxyundecyltrifluorosilane, 11-(meth)acryloxyundecyldifluoromethylsilane, 11-(meth)acryloxyundecylfluorodimethylsilane, 12-(meth)acryloxydodecyltrifluorosilane, 12-(meth)acryloxydodecyldifluoromethylsilane, 2-(meth)acryloxydodecylfluorodimethylsilane, 13-(meth)acryloxytridecyltrifluorosilane, 3-(meth)acryloxytridecyldifluoromethylsilane, 13-(meth)acryloxytridecylfluorodimethylsilane, 14-(meth)acryloxytetradecyltrifluorosilane, 14-(meth)acryloxytetradecyldifluoromethylsilane, 14-(meth)acryloxytetradecylfluorodimethylsilane, 15-(meth)acryloxypentadecyltrifluorosilane, 15-(meth)actyloxypentadecyldifluoromethylsilane, 15-(meth)acryloxypentadecylfluorodimethylsilane, 16-(meth)acryloxyhexadecyltrifluorosilane, 16-(meth)acryloxyhexadecyldifluoromethylsilane, 16-(meth)acryloxyhexadecylfluorodimethylsilane, 17-(meth)acryloxyheptadecyltrifluorosilane, 17-(meth)acryloxyheptadecyldifluoromethylsilane, 17-(meth)acryloxyheptadecylfluorodimethylsilane, 18-(meth)acryloxyoctadecyltrifluorosilane, 18-(meth)acryloxyoctadecyldifluoromethylsilane, 18-(meth)acryloxyoctadecylfluorodimethylsilane, 19-(meth)acryloxynonadecyltrifluorosilane, 19-(meth)acryloxynonadecyldifluoromethylsilane, 19-(meth)acryloxynonadecylfluorodimethylsilane, 20-(meth)acryloxyicosyltrifluorosilane, 20-(meth)acryloxyicosyldifluoromethylsilane, 20-(meth)acryloxyicosylfluorodimethylsilane, 3-(meth)acryloxypropyltrifluorosilane and 3-(meth)acryloxypropyldifluoromethylsilane; chlorosilane compounds such as 3-(meth)acryloxypropyltrichlorosilane, 3-(meth)acryloxypropyldichloromethylsilane, 3-(meth)acryloxypropylchlorodimethylsilane, 4-(meth)acryloxybutyltrichlorosilane, 4-(meth)acryloxybutyldichloromethylsilane, 4-(meth)acryloxybutylchlorodimethylsilane, 5-(meth)acryloxypentyltrichlorosilane, 5-(meth)acryloxypentyldichloromethylsilane, 5-(meth)acryloxypentylchlorodimethylsilane, 6-(meth)acryloxyhexyltrichlorosilane, 6-(meth)acryloxyhexyldichloromethylsilane, 6-(meth)acryloxyhexylchlorodimethylsilane, 7-(meth)acryloxyheptyltrichlorosilane, 7-(meth)acryloxyheptyldichloromethylsilane, 7-(meth)acryloxyheptylchlorodimethylsilane, 8-(meth)acryloxyoctyltrichlorosilane, 8-(meth)acryloxyoctyldichloromethylsilane, 8-(meth)acryloxyoctylchlorodimethylsilane, 9-(meth)acryloxynonyltrichlorosilane, 9-(meth)acryloxynonyldichloromethylsilane, 9-(meth)acryloxynonylchlorodimethylsilane, 10-(meth)acryloxydecyltrichlorosilane, 10-(meth)acryloxydecyldichloromethylsilane, 10-(meth)acryloxydecylchlorodimethylsilane, 11-(meth)acryloxyundecyltrichlorosilane, 11-(meth)acryloxyundecychloromethylsilane, 11-(meth)acryloxyundecylchlorodimethylsilane, 12-(meth)acryloxydodecyltrichlorosilane, 12-(meth)acryloxydodecyldichloromethylsilane, 12-(meth)acryloxydodecylchlorodimethylsilane, 13-(meth)acryloxyoxytridecyltrichlorosilane, 13-(meth)acryloxytridecyldichloromethylsilane, 13-(meth)acryloxytridecylchlorodimethylsilane, 14-(meth)acryloxytetradecyltrichlorosilane, 14-(meth)acryloxytetradecyldichloromethylsilane, 14-(meth)acryloxytetradecylchlorodimethylsilane, 15-(meth)acryloxypentadecyltrichlorosilane, 15-(meth)acryloxypentadecyldichloromethylsilane, 15-(meth)acryloxypentadecylchlorodimethylsilane, 16-(meth)acryloxyhexadecyltrichlorosilane, 16-(meth)acryloxyhexadecyldichloromethysilane, 16-(meth)acryloxyhexadecylchlorodimethylsilane, 17-(meth)acryloxyheptadecyltrichlorosilane, 17-(meth)acryloxyheptadecyldichloromethylsilane, 17-(meth)acryloxyheptadecylchlorodimethylsilane, 18-(meth)acryloxyoctadecyltrichlorositane, 18-(meth)acryloxyoctadecyldichloromethylsilane, 18-(meth)acryloxyoctadecylchlomdimethylsilane; 19-(meth)acryloxynonadecyltrichlorosilane, 19-(meth)acryloxynonadecyldichloromethylsilane, 19-(meth)acryloxynonadecylchlorodimethylsilane, 20-(meth)acryloxyicosyltrichlorosilane, 20-(meth)acryloxyicosyldichloromethylsilane and 20-(meth)acryloxyicosylchlorodimethylsilane; bromosilane compounds such as 3-(meth)acryloxypropyltribromosilane 3-(meth)acryloxypropyldibromomethylsilane, 3-(meth)acryloxypropylbromodimethylsilane, 4-(meth)acryloxybutyltribromosilane, 4-(meth)acryloxybutyldibromomethylsilane, 4-(meth)acryloxybutylbromodimethylsilane, 5-(meth)acryloxypentyltribromosilane, 5-(meth)acryloxypentyldibromomethylsilane, 5-(meth)acryloxypentylbromodimethylsilane, 6-(meth)acryloxyhexyltribromosilane, 6-(meth)acryloxyhexyldibromomethylsilane, 6-(meth)acryloxyhexylbromodimethylsilane, 7-(meth)acryloxyheptyltribromosilane, 7-(meth)acryloxyheptyldibromomethylsilane, 7-(meth)acryloxyheptylbromodimethylsilane, 8-(meth)acryloxyoctyltribromosilane, 8-(meth)acryloxyoctyldibromomethylsilane, 8-(meth)acryloxyoctylbromodimethylsilane, 9-(meth)acryloxynonyltribromosilane, 9-(meth)acryloxynonyldibromomethylsilane, 9-(meth)acryloxynonylbromodimethylsilane, 10-(meth)acryloxydecyltribromosilane, 10-(meth)acryloxydecyldibromomethylsilane, 10-(meth)acryloxydecylbromodimethylsilane, 11-(meth)acryloxyundecyltribromosilane, 11-(meth)acryloxyundecyldibromomethylsilane, 11-(meth)acryloxyundecylbromodimethylsilane, 12-(meth)acryloxydodecyltribromosilane, 12-(meth)acryloxydodecyldibromomethylsilane, 12-(meth)

acryloxydodecylbromodimethylsilane, 13-(meth)acryloxytridecyltribromosilane, 13-(meth)acryloxytridecyldibromomethylsilane, 13-(meth)acryloxytridecylbromodimethylsilane, 14-(meth)acryloxytetradecyltribromosilane, 14-(meth)acryloxytetradecyldibromomethylsilane, 14-(meth)acryloxytetradecylbromodimethylsilane, 15-(meth)acryloxypentadecyltribromosilane, 15-(meth)acryloxypentadecyldibromomethylsilane, 15-(meth)acryloxypentadecylbromodimethylsilane, 16-(meth)acryloxyhexadecyltribromosilane, 16-(meth)acryloxyhexadecyldibromomethylsilane, 16-(meth)acryloxyhexadecylbromodimethylsilane, 17-(meth)acryloxyheptadecyltribromosilane, 17-(meth)acryloxyheptadecyldibromomethylsilane, 17-(meth)acryloxyheptadecylbromodimethylsilane, 18-(meth)acryloxyoctadecyltribromosilane,18-(meth)acryloxyoctadecyldibromomethylsilane, 18-(meth)acryloxyoctadecylbromodimethylsilane, 19-(meth)acryloxynonadecyltribromosilane, 19-(meth)acryloxynonadecyldibromomethylsilane, 19-(meth)acryloxynonadecylbromodimethylsilane, 20-(meth)acryloxyicosyltribromosilane, 20-(meth)acryloxyicosyldibromomethylsilane and 20-(meth)acryloxyicosylbromomethylsilane; and iodosilane compounds such as 3-(meth)acryloxypropyltriiodosilane, 3-(meth)acryloxypropyldiiodomethylsilane, 3-(meth)acryloxypropyliododimethylsilane, 4-(meth)acryloxybutyitriiodosilane, 4-(meth)acryloxybutyldiiodomethylsilane, 4-(meth)acryloxybutyliododimethylsilane, 5-(meth)acryloxypentyltriiodosilane, 5-(meth)acryloxypentyldiiodomethylsilane, 5-(meth)acryloxypentyliododimethylsilane, 6-(meth)acryloxyhexyltriiodosilane 6-(meth)acryloxyhexyldiiodomethylsilane, 6-(meth)acryloxyhexyliododimethylsilane, 7-(meth)acryloxyheptyltriiodosilane, 7-(meth)acryloxyheptyldiiodomethylsilane, 7-(meth)acryloxyheptyliododimethylsilane, 8-(meth)acryloxyoctyltriiodosilane, 8-(meth)acryloxyoctyldiiodomethylsilane, 8-(meth)acryloxyoctyliododimethylsilane, 9-(meth)acryloxynonyltriiodosilane, 9-(meth)acryloxynonyldiiodomethylsilane, 9-(meth)acryloxynonyliododimethylsilane, 10-(meth)acryloxydecyltriiodosilane, 10-(meth)acryloxydecyldiiodomethylsilane, 10-(meth)acryloxydecyliododimethylsilane, 11-(meth)acryloxyundecyltriiodosilane, 11-(meth)acryloxyundecyldiiodomethylsilane, 11-(meth)acryloxyundecyliododimethylsilane, 12-(meth)acryloxydodecyltriiodosilane, 12-(meth)acryloxydodecyldiiodomethylsilane, 12-(meth)acryloxydodecyliododimethylsilane, 13-(meth)acryloxytridecyltriiodosilane, 13-(meth)acryloxytridecyldiiodomethylsilane, 13-(meth)acryloxyoxytridecyliododimethylsilane, 14-(meth)acryloxytetradecyltriiodosilane, 14-(meth)acryloxytetradecyldiiodomethylsilane, 14-(meth)acryloxytetradecyliododimethylsilane, 15-(meth)acryloxypentadecyltriiodosilane, 15-(meth)acryloxypentadecyldiiodomethylsilane, 15-(meth)acryloxypentadecyliododimethylsilane, 16-(meth)acryloxyhexadecyltriiodosilane, 16-(meth)acryloxyhexadecyldiiodomethylsilane, 16-(meth)acryloxyhexadecyliododimethylsilane, 17-(meth)acryloxyheptadecyltriiodosilane, 17-(meth)acryloxyheptadecyldiiodomethylsilane, 17-(meth)acryloxyheptadecyliododimethylsilane, 18-(meth)acryloxyoctadecyltriiodosilane, 18-(meth)acryloxyoctadecyldiiodomethylsilane, 18-(meth)acryloxyoctadecyliododimethylsilane, 19-(meth)acryloxynonadecyltriiodosilane, 19-(meth)acryloxynonadecyldiiodomethylsilane, 19-(meth)acryloxynonadecyliododimethylsilane, 20-(meth)acryloxyicosyltriiodosilane, 20-(meth)acryloxyicosyldiiodomethylsilane and 20-(meth)acryloxyicosyliodomethylsilane.

Of these, particularly from the standpoint of the availability of the precursor starting material, 3-(meth)acryloxypropyltrichlorosilane, 3-(meth)acryloxypropyldichloromethylsilane, 3-(meth)acryloxypropylchlorodimethylsilane, 4-(meth)acryloxybutyltrichlorosilane, 4-(meth)acryloxybutyldichloromethylsilane, 4-(meth)acryloxybutylchlorodimethylsilane, 5-(meth)acryloxypentyltrichlorosilane, 5-(meth)acryloxypentyldichloromethylsilane, 5-(meth)acryloxypentylchlorodimethylsilane, 6-(meth)acryloxyhexyltrichlorosilane, 6-(meth)acryloxyhexyldichloromethylsilane, 6-(meth)acryloxyhexylchlorodimethylsilane, 7-(meth)acryloxyheptyltrichlorosilane, 7-(meth)acryloxyheptyldichloromethylsilane, 7-(meth)acryloxyheptylchlorodimethylsilane, 8-(meth)acryloxyoctyltrichlorosilane, 8-(meth)acryloxyoctyldichloromethylsilane and 8-(meth)acryloxyoctylchlorodimethylsilane are preferred.

In the preparation method of the invention, the relative proportions of Compound (1) and Compound (2) are not particularly limited. However, in terms of the reactivity and productivity, the amount of Compound (1) included per mole of Compound (2) is preferably in the range of 1 to 20 moles, more preferably 1 to 10 moles, and even more to preferably 1 to 5 moles.

The method for determining the contents of Compounds (1) to (3) in the reaction system is not particularly limited, although analytic techniques such as gas chromatography, high-performance liquid chromatography, thin-layer chromatography, nuclear magnetic resonance spectroscopy (NMR), infrared spectroscopy (IR.) and near-infrared spectroscopy (NIR) may be used.

In this invention, by carrying out the hydrosilylation reaction in the presence of an acid amide compound, the propagation reaction of the starting (meth)acrylate compound can be suppressed.

The acid amide compound is preferably an acid amide compound of general formula (4) below (referred to below as "Compound (4)") or a primary acid amide compound of general formula (5) below (referred to below as "Compound (5)").

$$R^4-[C(=O)-NR^5]_k \quad (4)$$

$$R^6-C(=O)-NH_2 \quad (5)$$

In general formula (4), $R^4$ is a hydrogen atom or a. k-valent hydrocarbon group of 1 to 30 carbon atoms, preferably 1 to 25 carbon atoms, more preferably 1 to 20 carbon atoms, and even more preferably 1 to 10 carbon atoms; and the subscript 'k' is the integer 1 or 2.

The monovalent hydrocarbon group when k is 1 may be linear, branched or cyclic. Specific examples include linear alkyl groups such as methyl, ethyl, n-propyl, n-butyl, n-pentyl, n-hexyl, n-heptyl, n-octyl, n-nonyl and n-decyl groups; branched alkyl groups such as sec-propyl, sec-butyl, tert-butyl, sec-pentyl, tert-pentyl, sec-hexyl, tert-hexyl, sec-heptyl, tert-heptyl, sec-octyl, tert-octyl, sec-nonyl, tert-nonyl, sec-decyl and tert-decyl groups; cyclic alkyl groups such as cyclopentyl and cyclohexyl groups; alkenyl groups such as vinyl, allyl, butenyl and mediallyl groups; aryl groups such as phenyl, tolyl and xylyl groups; and aralkyl groups such as benzyl and phenethyl groups.

The divalent hydrocarbon group when k is 2 may be linear, branched or cyclic. Specific examples include linear alkylene groups such as methylene, ethylene, trimethylene, tetramethylene, pentamethylene, hexamethylene, heptamethylene, octamethylene, nonamethylene, decylene, undecylene, dodecylene, tridecylene, tetradecylene, pentadecylene, hexadecylene, heptadecylene and octadecylene groups; branched alkylene groups such as sec-propylene, sec-butylene, tert-butylene, sec-pentylene, tert-pentylene, sec-hexylene, tert-hexylene, sec-heptylene, tert-heptylene, sec-octylene, tert-octylene, sec-nonylene, tert-nonylene, sec-decylene, tert-decylene, sec-undecylene, tert-undecylene, sec-dodecylene, tert-dodecylene, sec-tridecylene, tert-tridecylene, sec-tetradecylene, tert-tetradecylene, sec-pentadecylene, tert-pentadecylene, sec-hexadecylene, tert-hexadecylene, sec-heptadecylene, tert-heptadecylene, sec-octadecylene and tert-octadecylene groups; and cyclic alkylene groups such as cyclopropylene, cyclopentylene and cyclohexylene groups.

Of these, $R^4$ is preferably a hydrogen atom, a linear alkyl group of 1 to 20 carbon atoms or a linear alkenyl group of 2 to 20 carbon atoms. Particularly from the standpoint of availability, $R^4$ is more preferably a hydrogen atom, a linear alkyl group of 1 to 10 carbon atoms or a linear alkenyl group of 2 to 10 carbon atoms.

Some or all of the hydrogen atoms on these monovalent hydrocarbon groups and divalent hydrocarbon groups may be substituted with other substituents. These substituents are exemplified in the same way as the substituents with which some or all of the hydrogen atoms on the monovalent hydrocarbon group represented by $R^1$ may be substituted.

In general formula (4), each $R^5$ is independently a hydrogen atom or a monovalent hydrocarbon group of 1 to 30 carbon atoms, preferably 1 to 25 carbon atoms, more preferably 1 to 20 carbon atoms, and even more preferably 1 to 10 carbon atoms. This monovalent hydrocarbon group may have substituents thereon which are exemplified by the same as those mentioned above for $R^4$.

Of these, $R^5$ is preferably a hydrogen atom, a linear alkyl group of 1 to 20 carbon atoms or a linear alkenyl group of 2 to 20 carbon atoms. Particularly from the standpoint of availability, a hydrogen atom, a linear alkyl group of 1 to 10 carbon atoms or a linear alkenyl group of 2 to 10 carbon atoms is more preferred.

Specific examples of Compound (4) include N-methylacetamide, N,N-dimethylacetamide, malonamide, succinamide, maleamide, fumaramide, phthalamide, isophthalamide, terephthalamide, N-methylformamide, N,N-dimethylformamide, octanediamide, oxamide, glutaramide and adipamide.

In general formula (5), $R^6$ is a hydrogen atom or a substituted or unsubstituted monovalent hydrocarbon group of 1 to 30 carbon atoms, preferably 1 to 25 carbon atoms, more preferably 1 to 20 carbon atoms, and even more preferably 1 to 10 carbon atoms. This monovalent hydrocarbon group may have substituents thereon which are exemplified by the same as those mentioned above for $R^4$.

Of these, $R^6$ is preferably a hydrogen atom, a linear alkyl group of 1 to 20 carbon atoms or a linear alkenyl group of 2 to 10 carbon atoms. Particularly from the standpoint of availability, a hydrogen atom, a linear alkyl group of 1 to 10 carbon atoms or a linear alkenyl group of 2 to 10 carbon atoms is more preferred.

Some or all of the hydrogen atoms on these monovalent hydrocarbon groups and divalent hydrocarbon groups may be substituted with other substituents. These substituents are exemplified in the same way as the substituents with which some or all of the hydrogen atoms on the monovalent hydrocarbon group represented by $R^1$ may be substituted.

Specific examples of Compound (5) include acetamide, acrylamide, benzamide, 2-naphthamide, nicotinamide, isonicotinamide, 2-furamide, formamide, propionamide, propiolamide, butyramide, isobutyramide, hexanamide, cyclohexane carboxamide, methaciylamide, paimitamide, stearamide, oleamide, erucamide and cinnamamide.

These are commercially available as reagents. Particularly from the standpoints of availability and the adjuvant effects, acetamide, N-methylacetamide, N,N-dimethylacetamide, malonamide, succinamide, maleamide, fumaramide, benzamide, propionamide, butyramide, palmitamide, stearamide, oleamide and erucamide are preferred.

The amount of acid amide compound used is not particularly limited so long as it exhibits effects with respect to Compound (2) and Compound (3) and is an amount which suppresses the propagation reaction. From the standpoint of productivity, the acid amide compound is used in an amount that is preferably from 0.0001 to 10 wt %, more preferably form 0.001 to 5 wt %, and even more preferably from 0.01 to 1 wt %, of Compound (2).

The platinum catalyst used in the invention may be suitably selected from among known platinum (Pt) compounds and known complex compounds in which platinum is the center metal.

Specific examples include chloroplatinic acids; alcohol solutions of chloroplatinic acids, such as a 2-ethylhexanol solution of hexachloroplatinic(IV) acid; toluene or xylene solutions of platinum-1,3-divinyl-1,1,3,3-tetramethyldisiloxane complexes; dichloro(bisacetonitrile)platinum(II) and dichloro(bisbenzonitrile)platinum(II); and to dichloro(cyclooctadiene)platinum(II).

A catalyst composed of platinum black or the like supported on a support such as alumina, silica or carbon may also be used.

Particularly from the standpoint of the degree of reactivity, alcohol solutions of chloroplatinic acids, such as a 2-ethylhexanol solution of hexachloroplatinic(IV) acid, and toluene or xylene solutions of a platinum-1,3-divinyl-1,1,3,3-tetramethyldisiloxane, complex are preferred.

The amount of platinum catalyst used is not particularly limited, so long as it is an amount that manifests a catalytic effect on the hydrosilylation reaction. However, from the standpoint of the reactivity and productivity, the amount per mole of compound (2), expressed in terms of the platinum metal, is preferably from 0.0000001 to 1 mole. more preferably from 0.000001 to 0.1 mole, and even more preferably from 0.00001 to 0.01 mole.

The reaction temperature in the hydrosilylation reaction is not particularly limited. However, from the standpoint of the reactivity and productivity, the reaction temperature is preferably between 50 and 200° C., more preferably between 50 and 150° C., and even more preferably between 50 and 100° C.

The reaction time also is not particularly limited, but is preferably from 1 to 30 hours, more preferably from 1 to 20 hours, and even more preferably from 1 to 10 hours.

The hydrosilylation reaction proceeds even in the absence of a solvent, although it is also possible to use a solvent. Examples of suitable solvents include hydrocarbon solvents such as pentane, hexane, cyclohexane, heptane, isooctane, benzene, toluene and xylene; ether solvents such as diethyl ether, tetrahydrofuran and dioxane; ester solvents such as ethyl acetate and butyl acetate; aprotic polar solvents such as acetonitrile and N,N-dimethylformamide; and chlorinated hydrocarbon solvents such as dichloromethane and chloroform. These solvents may be of one type used alone or two or more may be used in combination.

In the preparation method of the invention, a polymerization inhibitor may be used in addition to the acid amide compound.

When an acid amide compound and a polymerization inhibitor are used together, owing to the interplay between the effect by the acid amide compound of suppressing the propagation reaction of the starting (meth)acrylate compound and the effect by the polymerization inhibitor of suppressing the propagation reactions of the starting (meth) acrylate to compound and the (meth)acryloyloxy group-containing organosilicon compound serving as the product, a better overall effect can be achieved than when either is used alone.

Polymerization inhibitors that can be used in this invention include phenolic polymerization inhibitors and hindered phenolic polymerization inhibitors.

Examples of phenolic polymerization inhibitors include methoxyphenol compounds such as 4-methoxyphenol, 2-methyl-4-methoxyphenol, 3-methyl-4-methoxyphenol, 2,3-dimethyl-4-methoxyphenol, 2,5-dimethyl-4-methoxyphenol, 2,6-dimethyl-4-methoxyphenol, 3,5-dimethyl-4-methoxyphenol, 2-tert-butyl-4-methoxyphenol, 3-tert-butyl-4-methoxyphenol, 2-methyl-3-tert-butyl-4-methoxyphenol, 3-tert-butyl-5-methyl-4-methoxyphenol, 2,3-di-tert-butyl-4-methoxyphenol and 2,5-di-tert-butyl-4-methoxyphenol; and hydroxyphenol compounds such as 4-hydroxyphenol, 2-methyl-4-hydroxyphenol, 3-methyl-4-hydroxyphenol, 2,3-dimethyl-4-hydroxyphenol, 2,5-dimethyl-4-hydroxyphenol, 2,6-dimethyl-4-hydroxyphenol, 3,5-dimethyl-4-hydroxyphenol, 2-tert-butyl-4-hydroxyphenol, 3-tert-butyl-4-hydroxyphenol, 2-methyl-3-tert-butyl-4-hydroxyphenol, 3-tert-butyl-5-methyl-4-hydroxyphenol and 3,4-dihydro-2,5,7,8-tetramethyl-2-(4,8,12-trimethyltridecyl)-2H-1-benzopyran-6-ol.

Of these, particularly from the standpoint of availability, 4-methoxyphenol, 2-methyl-4-methoxyphenol, 2-tert-butyl-4-methoxyphenol and 4-hydroxyphenol are preferred.

The amount of phenolic polymerization inhibitor used is not particularly limited, provided that it is an amount which exhibits effects on Compound (2) and Compound (3) and suppresses the initiation and propagation reactions. However, from the standpoint of productivity, the amount with respect to Compound (2) is preferably from 0.0001 to 10 wt %, more preferably from 0.001 to 5 wt %, and even more preferably from 001 to 1 wt %.

Examples of hindered phenolic polymerization inhibitors include di-tert-butylphenol compounds such as 2,6-di-tert-butyl-4-methylphenol, 2,6-di-tert-butyl-4-ethylphenol, 4,4-methylenebis(2,6-di-tert-butylphenol), 2,2-methylenebis(6-tert-butyl-4-methylphenol), 2,2-methylenebis(6-tert-butyl-4-ethylphenol), 2,6-di-tert-butyl-4-dimethylaminomethylphenol, 2,6-di-tert-butyl-4-methoxyphenol, 2,6-di-tert-butyl-4-hydroxyphenol, pentaerythritoltetrakis[3-(3,5-di-tert-butyl-4-hydroxyphenyl)propionate], 2,2-thiodiethylenebis[3-(3,5-di-tert-butyl-4-hydroxyphenyl)propionate], octadecyl-3-(3,5-di-tert-butyl-4-hydroxyphenyl)propionate, N,N-hexamethylenebis[3-(3,5-di-tert-butyl-4-hydroxyphenyl)propionamide], 2,4,6-tris(3,5-di-tert-butyl-4-hydroxybenzyl)mesitylene and hexamethylenebis[3-(3,5-di-tert-butyl-4-hydroxyphenyl)propionate].

Of these, particularly from the standpoint of availability, di-tert-butylphenol is compounds such as 2,6-di-tert-butyl-4-methylphenol, 4,4-methylenebis(2,6-di-tert-butylphenol), 2,2-methylenebis(6-tert-butyl-4-methylphenol), 2,6-di-tert-butyl-4-dimethylaminomethylphenol, 2,6-di-tert-butyl-4-methoxyphenol and 2,6-di-tert-butyl-4-hydroxyphenol are preferred.

The hindered phenolic polymerization inhibitor is used in an amount which, in combination with a phenolic polymerization inhibitor, is not particularly limited provided that it is an amount which exhibits effects against Compound (2) and Compound (3) and suppresses the initiation and propagation reactions. From the standpoint of productivity, the amount with respect to Compound (2) is preferably from 0.0001 to 10 wt %, more preferably from 0.001 to 5 wt %, and even more preferably from 0.01 to 1 wt %.

In the preparation method of the invention, the acid amide compound, the phenolic polymerization inhibitor and the hindered phenolic polymerization inhibitor may each be of one type used alone from the respective group of compounds, or two or more from the respective group of compounds may be used in admixture.

In the preparation method of the invention, in addition to the acid amide compound, phenolic polymerization inhibitor and hindered phenolic polymerization inhibitor, a known polymerization inhibitor that is effective in radical polymerization may be suitably selected and used in cases where doing so does not lower the reactivity of the hydrosilylation reaction and does not compromise the quality of Compound (3) obtained as the final product.

Specific examples include quinone compounds such as p-benzoquinone, methyl-p-benzoquinone, tert-butyl-p-benzoquinone and 2,5-diphenyl-p-bezoquinone; copper compounds such as cuprous chloride, cupric chloride, cuprous oxide, cupric oxide, copper sulfate and copper dimethyldithiocarbamate; nitrogen atom-containing compounds such as phenothiazine, diphenylamine, alkylated diphenylamines, phenylenediamine, N,N-diphenyl-p-phenylenediamine, N,N-dinaphthyl-p-phenylenediamine, 4-hydroxy-2,2,6,6-tetramethylpiperidine, 4-benzoyloxy-2,2,6,6-tetramethylpiperidine, to 1,4-dihydroxy-2,2,6,6-tetramethylpiperidine and 1-hydroxy-4-benzoyloxy-2,2,6,6-tetramethylpiperidine; phosphorus atom-containing compounds such as tri-n-hexylphosphine, tri-n-octylphosphine, triphenylphosphine, tris(2-methylphenyl)phosphine, tris(4-methylphenyl)phosphine, tris(6-methylphenyl)phosphine, tris(2,4-di-tert-butylphenyl)phosphine, triphenyl phosphite, zinc dialkyldithiophosphates and zinc diallyldithiophosphate; sulfur atom-containing compounds such as butyl sulfide, didodecyl 3,3'-thiodipropionate and tetramethylthiuram disulfide; and aliphatic conjugated unsaturated bond-containing compounds such as paulownia oil, dehydrated castor oil and conjugated linoleic oil. These polymerization inhibitors may be of one type used alone or two or more may be used in combination.

In the preparation method of the invention, in addition to the above polymerization inhibitors, additives such as antioxidants, vulcanization accelerators, metal deactivators, ultraviolet absorbers and light stabilizers may be used in combination, provided that doing so does not lower the reactivity of the hydrosilylation reaction and does not compromise the quality of Compound (3) obtained as the final product.

EXAMPLES

The following Examples and Comparative Examples are provided to illustrate the invention, but are not intended to limit the scope thereof.

The proportions in the reaction mixtures below were determined by gas chromatography performed under the following conditions.

Gas Chromatography Conditions

| | |
|---|---|
| Gas chromatograph: | GC-2014 (Shimadzu Corporation) |
| Packed column: | Silicone SE-30 (GL Sciences Inc.) |
| Detector: | TCD |
| Detector temperature: | 300° C. |
| Injection port temperature: | 300° C. |
| Temperature program: | 70° C. (0 min) → 10° C./min → 300° C. (10 min) |
| Carrier gas: | helium (50 mL/min) |
| Injection rate: | 1 µL |

Example 1

Synthesis of 3-Acryloxypropyltrichlorosilane

A flask equipped with a stirrer, a reflux condenser, a dropping funnel and a thermometer was charged at room temperature with 112.1 g (1.000 mol) of allyl acrylate, 0.1 g of acetamide (which corresponds to 0.1 wt % with respect to the allyl acrylate) and a 2-ethylhexanol solution of hexachloroplatinic(IV) acid (000001 mole in terms of platinum atoms), and the system was heated over a period of 2 hours until it reached 80° C. Once the internal temperature had stabilized, 135.5 g (1.000 mol) of trichlorosilane was added dropwise over 10 hours at between 80° C. and 100° C., and the system was stirred at this temperature for 10 hours.

The resulting reaction mixture was analyzed by gas chromatography, whereupon the area percent ratio for the ally' acrylate and trichlorosilane serving as the starting materials and the 3-acryloxypropyltrichlorosilane obtained as the product was found to be 6:0:94.

Ten grams of this reaction mixture was placed in a thoroughly nitrogen-purged 20 mL threaded test tube, heated to 150° C., and the thermal stability was checked. After 5 hours had elapsed, the reaction mixture remained flowable and a tendency to self-polymerize was not observed.

Example 2

Synthesis of 3-Acryloxypropyltrichlorosilane

Aside from adding dropwise 67.8 g (0.500 mol) of trichlorosilane at between 80° C. and 100° C. over a period of 5 hours, the reaction was carried out in the same way as in Example 1.

The resulting reaction mixture was analyzed by gas chromatography, whereupon the area percent ratio for the allyl acrylate and trichlorosilane serving as the starting materials and the 3-acryloxypropyltrichlorosilane obtained as the product was found to be 46:0:54.

Ten grams of this reaction mixture was placed in a thoroughly nitrogen-purged 20 mL to threaded test tube, heated to 135° C. and the thermal stability was checked. After 5 hours had elapsed, the reaction mixture remained flowable and a tendency to self-polymerize was not observed.

Example 3

Synthesis of 3-Acryloxypropyltrichlorosilme

Aside from adding dropwise 33,9 g (0.250 mol) of trichlorosilane at between 80° C. and 100° C. over a period of 2.5 hours, the reaction was carried out in the same way as in Example 1.

The resulting reaction mixture was analyzed by gas chromatography, whereupon the area percent ratio for the allyl acrylate and trichlorosilane serving as the starting materials and the 3-acryloxypropyltrichlorosilane obtained as the product was found to be 72:0:28.

Ten grams of this reaction mixture was placed in a thoroughly nitrogen-purged 20 mL threaded test tube, heated to 125° C., and the thermal stability was checked. After 5 hours had elapsed, the reaction mixture remained flowable and a tendency to self-polymerize was not observed.

Example 4

Synthesis of 3-Acryloxypropyltrichlorosilane

Aside from adding dropwise 4.1 g (0.030 moll of trichlorosilane at between 80° C. and 100° C. over a period of 0.3 hour, the reaction was carried out in the same way as in Example 1.

The resulting reaction mixture was analyzed by gas chromatography, whereupon the area percent ratio for the allyl acrylate and trichlorosilane serving as the starting materials and the 3-acryloxypropyltrichlorosilane obtained as the product was found to be 98:0:2.

Ten grams of this reaction mixture was placed in a thoroughly nitrogen-purged 20 mL threaded test tube, heated to 115° C., and the thermal stability was checked. After 5 hours had elapsed, the reaction mixture remained flowable and a tendency to self-polymerize was not observed.

Example 5

Synthesis of 3-Acryloxypropyltrichlorosilane

Aside from using 0.1 g of benzamide (which corresponds to 0.1 wt % with respect to the allyl acrylate) instead of acetamide, the reaction was carried out in the same way as in Example 1.

Ten grams of this reaction mixture was placed in a thoroughly nitrogen-purged 20 mL threaded test tube, heated to 150° C., and the thermal stability was checked. After 5 hours had elapsed, the reaction mixture remained flowable and a tendency to self-polymerize was not observed.

Example 6

Synthesis of 3-Acryloxypropyltrichlorosilane

Aside from using 0.1 g of benzamide (which corresponds to 0.1 wt % with respect to the allyl acrylate) instead of acetamide, the reaction was carried out in the same way as in Example 2.

Ten grams of this reaction mixture was placed in a thoroughly nitrogen-purged 20 mL threaded test tube, heated to 135° C., and the thermal stability was checked. After 5 hours had elapsed, the reaction mixture remained flowable and a tendency to self-polymerize was not observed.

Example 7

Synthesis of 3-Acryloxypropyltrichlorosilane

Aside from using 0.1 g of benzamide (which corresponds to 0.1 wt % with respect to the allyl actylate) instead of acetamide, the reaction was carded out in the same way as in Example 3.

Ten grams of this reaction mixture was placed in a thoroughly nitrogen-purged 20 mL threaded test tube, heated to 125° C., and the thermal stability was checked. After 5 hours had elapsed, the reaction mixture remained flowable and a tendency to self-polymerize was not observed.

Example 8

Synthesis of 3-Acryloxypropyltrichlorosilane

Aside from using 0.1 g of benzamide (which corresponds to 0.1 wt % with respect to the allyl acrylate) instead of acetamide, the reaction was carried out in the same way as in Example 4.

Ten grams of this reaction mixture was placed in a thoroughly nitrogen-purged 20 mL threaded test tube, heated to 115° C., and the thermal stability was checked. After 5 hours had elapsed, the reaction mixture remained flowable and a tendency to self-polymerize was not observed.

Example 9

Synthesis of 3-Acryloxypropyltrichlorosilane

Aside from using 0.1 g of oleamide (which corresponds to 0.1 wt % with respect to the allyl acrylate) instead of acetamide, the reaction was carried out in the same way as in Example 1.

Ten grams of this reaction mixture was placed in a thoroughly nitrogen-purged 20 mL threaded test tube, heated to 150° C., and the thermal stability was checked. After 5 hours had elapsed, the reaction mixture remained flowable and a tendency to self-polymerize was not observed.

Example 10

Synthesis of 3-Acryloxypropyltrichlorosilane

Aside from using 0.1 g of oleamide (which corresponds to 0.1 wt % with respect to the allyl actylate) instead of acetamide, the reaction was carried out in the same way as in Example 2.

Ten grams of this reaction mixture was placed in a thoroughly nitrogen-purged 20 mL threaded test tube, heated to 135° C., and the thermal stability was checked. After 5 hours had elapsed, the reaction mixture remained flowable and a tendency to self-polymerize was not observed.

Example 11

Synthesis of 3-Acryloxypropyltrichlorosilane

Aside from using 0.1 g of oleamide (which corresponds to 0.1 wt % with respect to the allyl acrylate) instead of acetamide, the reaction was carried out in the same way as in Example 3.

Ten grams of this reaction mixture was placed in a thoroughly nitrogen-purged 20 mL threaded test tube, heated to 125° C., and the thermal stability was checked. After 5 hours had elapsed, the reaction mixture remained flowable and a tendency to self-polymerize was not observed.

Example 12

Synthesis of 3-Acryloxypropyltrichlorosilane

Aside from using 0.1 g of oleamide (which corresponds to 0.1 wt % with respect to the allyl acrylate) instead of acetamide, the reaction was carried out in the same way as in Example 4.

Ten grams of this reaction mixture was placed in a thoroughly nitrogen-purged 20 mL threaded test tube, heated to 115° C., and the thermal stability was checked. After 5 hours had elapsed, the reaction mixture remained flowable and a tendency to self-polymerize was not observed.

Example 13

Synthesis of 3-Acryloxypropyltrichlorosilane

Aside from using 0.1 g of N-methylacetamide (which corresponds to 0.1 wt % with respect to the allyl acrylate) instead of acetamide, the reaction was carried out in the same way as in Example 1, Ten grams of this reaction mixture was placed in a thoroughly nitrogen-purged 20 mL threaded test tube, heated to 150° C., and the thermal stability was checked. After 5 hours had elapsed, the reaction mixture remained flowable and a tendency to self-polymerize was not observed.

Example 14

Synthesis of 3-Acryloxypropyltrichlorosilane

Aside from using 0.1 g of N,N-dimethylacetamide (which corresponds to 0.1 wt % with respect to the allyl acrylate) instead of acetamide, the reaction was carried out in the same way as in Example 1.

Ten grams of this reaction mixture was placed in a thoroughly nitrogen-purged 20 mL threaded test tube, heated to 150° C., and the thermal stability was checked. After 5 hours had elapsed, the reaction mixture remained flowable and a tendency to self-polymerize was not observed.

Example 15

Synthesis of 3-Acryloxypropyltrichlorosilane

Aside from using 0.1 g of malonamide (which corresponds to 0.1 wt % with respect to the allyl acrylate) instead of acetamide, the reaction was carried out in the same way as in Example 1.

Ten grams of this reaction mixture was placed in a thoroughly nitrogen-purged 20 mL threaded test tube, heated to 150° C., and the thermal stability was checked. After 5 hours had elapsed, the reaction mixture remained flowable and a tendency to self-polymerize was not observed.

Example 16

Synthesis of 3-Acryloxypropyltrichlorosilane

Aside from using 0.1 g of succinamide (which corresponds to 0.1 wt % with respect to the allyl acrylate) instead of acetamide, the reaction was carded out in the same way as in Example 1.

Ten grams of this reaction mixture was placed in a thoroughly nitrogen-purged 20 mL threaded test tube, heated to 150° C., and the thermal stability was checked. After 5 hours had elapsed, the reaction mixture remained flowable and a tendency to self-polymerize was not observed.

Example 17

Synthesis of 3-Acryloxypropyltrichlorosilane

Aside from using 0.1 g of maieaniide. (which corresponds to 0.1 wt % with respect to the allyl acrylate) instead of acetamide, the reaction was carried out in the same way as in Example 1.

Ten grams of this reaction mixture was placed in a thoroughly nitrogen-purged 20 mL threaded test tube, heated to 150° C., and the thermal stability was checked. After 5 hours had elapsed, the reaction mixture remained flowable and a tendency to self-polymerize was not observed.

Example 18

Synthesis of 3-Acryloxypropyltrichlorosilane

Aside from using 0.1 g of fumaramide (which corresponds to 0.1 wt % with respect to the allyl acrylate) instead of acetamide, the reaction was carried out in the same way as in Example 1.

Ten grams of this reaction mixture was placed in a thoroughly nitrogen-purged 20 mL threaded test tube, heated to 150° C., and the thermal stability was checked. After 5 hours had elapsed, the reaction mixture remained flowable and a tendency to self-polymerize was not observed.

Example 19

Synthesis of 3-Acryloxypropyltrichlorosilane

Aside from using 0.1 g of propionamide (which corresponds to 0.1 wt % with respect to the allyl acrylate) instead of acetamide, the reaction was carried out in the same way as in Example 1.

Ten grams of this reaction mixture was placed in a thoroughly nitrogen-purged 20 mL threaded test tube, heated to 150° C., and the thermal stability was checked. After 5 hours had elapsed, the reaction mixture remained flowable and a tendency to self-polymerize was not observed.

Example 20

Synthesis of 3-Acryloxypropyltrichlorosilane

Aside from using 0.1 g of butyramide (which corresponds to 0.1 wt % with respect to the allyl acrylate) instead of acetamide, the reaction was carried out in the same way as in Example 1.

Ten grams of this reaction mixture was placed in a thoroughly nitrogen-purged 20 mL threaded test tube, heated to 150° C., and the thermal stability was checked. After 5 hours had elapsed, the reaction mixture remained flowable and a tendency to self-polymerize was not observed.

Example 21

Synthesis of 3-Acryloxypropyltrichlorosilane

Aside from using 0.1 g of palmitamide (which corresponds to 0.1 wt % with respect to the allyl acrylate) instead of acetamide, the reaction was carried out in the same way as in Example 1.

Ten grams of this reaction mixture was placed in a thoroughly nitrogen-purged 20 mL threaded test tube, heated to 150° C., and the thermal stability was checked. After 5 hours had elapsed, the reaction mixture remained flowable and a tendency to self-polymerize was not observed.

Example 22

Synthesis of 3-Acryloxypropyltrichlorosilane

Aside from using 0.1 g of stearamide (which corresponds to 0.1 wt % with respect to the allyl acrylate) instead of acetamide, the reaction was carried out in the same way as in Example 1.

Ten grams of this reaction mixture was placed in a thoroughly nitrogen-purged 20 mL threaded test tube, heated to 150° C., and the thermal stability was checked. After 5 hours had elapsed, the reaction mixture remained flowable and a tendency to self-polymerize was not observed.

Example 23

Synthesis of 3-Acryloxypropyltrichlorosilane

Aside from using 0.1 g of erucamide (which corresponds to 0.1 wt % with respect to the allyl acrylate) instead of acetamide, the reaction was carried out in the same way as in Example 1.

Ten grams of this reaction mixture was placed in a thoroughly nitrogen-purged 20 mL threaded test tube, heated to 150° C., and the thermal stability was checked. After 5 hours had elapsed, the reaction mixture remained flowable and a tendency to self-polymerize was not observed.

Example 24

Synthesis of 3-Acryloxypropyltrichlorosilane

Aside from further adding 0.1 g of 4-methoxyphenol (which corresponds to 0.1 wt % with respect to the allyl acrylate), the reaction was carried out in the same way as in Example 1.

Ten grams of this reaction mixture was placed in a thoroughly nitrogen-purged 20 mL threaded test tube, heated to 150° C., and the thermal stability was checked. After 6 hours had elapsed, the reaction mixture remained flowable and a tendency to self-polymerize was not observed.

Example 25

Synthesis of 3-Acryloxypropyltrichlorosilane

Aside from further adding 0.1 g of 2-methyl-4-methoxyphenol (which corresponds to 0.1 wt % with respect to the allyl acrylate), the reaction was carried out in the same way as in Example 1.

Ten grams of this reaction mixture was placed in a thoroughly nitrogen-purged 20 mL threaded test tube, heated to 150° C., and the thermal stability was checked. After 6 hours had elapsed, the reaction mixture remained flowable and a tendency to self-polymerize was not observed.

Example 26

Synthesis of 3-Acryloxypropyltrichlorosilane

Aside from further adding 0.1 g of 2-tert-butyl-4-methoxyphenol (which corresponds to 0.1 wt % with respect to the allyl acrylate), the reaction was carried out in the same way as in Example 1.

Ten grams of this reaction mixture was placed in a thoroughly nitrogen-purged 20 mL threaded test tube, heated to 150° C., and the thermal stability was checked. After 6 hours had elapsed, the reaction mixture remained flowable and a tendency to self-polymerize was not observed.

Example 27

Synthesis of 3-Acryloxypropyltrichlorosilane

Aside from further adding 0.1 g of 4-hydroxyphenol (which corresponds to 0.1 wt % with respect to the allyl acrylate), the reaction was carried out in the same way as in Example 1.

Ten grams of this reaction mixture was placed in a thoroughly nitrogen-purged 20 mL threaded test tube, heated to 150° C., and the thermal stability was checked. After 6 hours had elapsed, the reaction mixture remained flowable and a tendency to self-polymerize was not observed.

Example 28

Synthesis of 3-Acryloxypropyltrichlorosilane

Aside from further adding 0.1 g of 4-methoxyphenol (which corresponds to 0.1 wt % with respect to the allyl acrylate), the reaction was carried out in the same way as in Example 5.
Ten grams of this reaction mixture was placed in a thoroughly nitrogen-purged 20 mL threaded test tube, heated to 150° C., and the thermal stability was checked. After 6 hours had elapsed, the reaction mixture remained flowable and a. tendency to self-polymerize was not observed.

Example 29

Synthesis of 3-Acryloxypropyltrichlorosilane

Aside from further adding 0.1 g of 2-methyl-4-methoxyphenol (which corresponds to 0.1 wt % with respect to the allyl acrylate), the reaction was carried out in the same way as in Example 5.
Ten grams of this reaction mixture was placed in a thoroughly nitrogen-purged 20 mL threaded test tube, heated to 150° C., and the thermal stability was checked. After 6 hours had elapsed, the reaction mixture remained flowable and a tendency to self-polymerize was not observed.

Example 30

Synthesis of 3-Acryloxypropyltrichlorosilane

Aside from further adding 0.1 g of 2-tert-butyl-4-methoxyphenol (which corresponds to 0.1 wt % with respect to the allyl acrylate), the reaction was carried out in the same way as in Example 5.
Ten grams of this reaction mixture was placed in a thoroughly nitrogen-purged 20 mL threaded test tube, heated to 150° C., and the thermal stability was checked. After 6 hours had elapsed, the reaction mixture remained flowable and a tendency to self-polymerize was not observed.

Example 31

Synthesis of 3-Acryloxypropyltrichlorosilane

Aside from further adding 0.1 g of 4-hydroxyphenol (which corresponds to 0.1 wt % with respect to the allyl acrylate), the reaction was carried out in the same way as in Example 5.
Ten grams of this reaction mixture was placed in a thoroughly nitrogen-purged 20 mL threaded test tube, heated to 150° C., and the thermal stability was checked. After 6 hours had elapsed, the reaction mixture remained flowable and a tendency to self-polymerize was not observed.

Example 32

Synthesis of 3-Acryloxypropyltrichlorosilane

Aside from further adding 0.1 g of 4-methoxyphenol (which corresponds to 0.1 wt % with respect to the allyl acrylate), the reaction was carried out in the same way as in Example 9.

Ten grams of this reaction mixture placed in a thoroughly nitrogen-purged 20 mL threaded test tube, heated to 150° C., and the thermal stability was checked. After 6 hours had elapsed, the reaction mixture remained flowable and a tendency to self-polymerize was not observed.

Example 33

Synthesis of 3-Acryloxypropyttrichlorosilane

Aside from further adding 0.1 g of 2-methyl-4-methoxyphenol (which corresponds to 0.1 wt % with respect to the allyl acrylate), the reaction was carried out in the same way as in Example 9.
Ten grams of this reaction mixture was placed in a thoroughly nitrogen-purged 20 mL threaded test tube, heated to 150° C., and the thermal stability was checked. After 6 hours had elapsed, the reaction mixture remained flowable and a tendency to self-polymerize was not observed.

Example 34

Synthesis of 3-Acryloxypropyltrichlorosilane

Aside from further adding 0.1 g of 2-tert-butyl-4-methoxyphenol (which corresponds to 0.1 wt % with respect to the allyl acrylate), the reaction was carried out in the same way as in Example 9.
Ten grams of this reaction mixture was placed in a thoroughly nitrogen-purged 20 mL threaded test tube, heated to 150° C., and the thermal stability was checked. After 6 hours had elapsed, the reaction mixture remained flowable and a. tendency to self-polymerize was not observed.

Example 35

Synthesis of 3-Acryloxypropyltrichlorosilane

Aside from further adding 0.1 g of 4-hydroxyphenol (which corresponds to 0.1 wt % with respect to the allyl acrylate), the reaction was carried out in the same way as in Example 9.
Ten grams of this reaction mixture was placed in a thoroughly nitrogen-purged 20 mL threaded test tube, heated to 150° C., and the thermal stability was checked. After 6 hours had elapsed, the reaction mixture remained flowable and a tendency to self-polymerize was not observed.

Example 36

Synthesis of 3-Acryloxypropyltrichlorosilane

Aside from further adding 0,1 g of 2,6-di-test-butyl-4-methylphenol (which corresponding to 0.1 wt % with respect to the allyl acrylate), the reaction was carried out in the same way as in Example 1.
Ten grams of this reaction mixture was placed in a thoroughly nitrogen-purged 20 mL threaded test tube, heated to 150° C., and the thermal stability was checked. After 20 hours had elapsed, the reaction mixture remained flowable and a tendency to self-polymerize was not observed.

Example 37

Synthesis of 3-Acryloxypropyltrichlorosilane

Aside from further adding 0.1 g of 4,4-methylenebis(2,6-di-tert-butylphenol) (which corresponds to 0.1 wt % with respect to the allyl acrylates), the reaction was carried out in the same way as in Example 1.

Ten grams of this reaction mixture was placed in a thoroughly nitrogen-purged 20 mL threaded test tube, heated to 150° C., and the thermal stability was checked. After 20 hours had elapsed, the reaction mixture remained flowable and a tendency to self-polymerize was not observed.

Example 38

Synthesis of 3-Acryloxypropyltrichlorosilane

Aside from further adding 0.1 g of 2,2-methylenebis(6-tert-butyl-4-methylphenol) (which corresponds to 0.1 wt % with respect to the allyl acrylate), the reaction was carried out in the same way as in Example 1.

Ten grams of this reaction mixture was placed in a thoroughly nitrogen-purged 20 mL threaded test tube, heated to 150° C., and the thermal stability was checked. After 20 hours had elapsed, the reaction mixture remained flowable and a tendency to self-polymerize was not observed.

Example 39

Synthesis of 3-Acryloxypropyltrichlorosilane

Aside from further adding 0.1 g of 2,6-di-tert-butyl-4-dimethylaminomethylphenol (which corresponds to 0.1 wt % with respect to the allyl acrylate), the reaction was carried out in the same way as in Example 1.

Ten grams of this reaction mixture was placed in a thoroughly nitrogen-purged 20 mL threaded test tube, heated to 150° C., and the thermal stability was checked. After 20 hours had elapsed, the reaction mixture remained flowable and a tendency to self-polymerize was not observed.

Example 40

Synthesis of 3-Acryloxypropyltrichlorosilane

Aside from further adding 0.1 g of 2,6-di-tert-butyl-4-methoxyphenol (which corresponds to 0.1 wt % with respect to the allyl acryla.te), the reaction was carried out in the same way as in Example 1.

Ten grams of this reaction mixture was placed in a thoroughly nitrogen-purged 20 mL threaded test tube, heated to 150° C., and the thermal stability was checked. After 20 hours had elapsed, the reaction mixture remained flowable and a tendency to self-polymerize was not observed.

Example 41

Synthesis of 3-Acryloxypropyltrichlorosilane

Aside from further adding 0.1 g of 2.6-di-tert-butyl-4-hydroxyphenol (which corresponds to 0.1 wt % with respect to the allyl acrylate), the reaction was carried out in is the same way as in Example 1.

Ten grams of this reaction mixture was placed in a thoroughly nitrogen-purged 20 mL threaded test tube, heated to 150° C., and the thermal stability was checked. After 20 hours had elapsed, the reaction mixture remained flowable and a tendency to self-polymerize was not observed.

Example 42

Synthesis of 3-Acryloxypropyltrichlorosilane

Aside from further adding 0.1 g of 3,4-dihydro-2,5,7,8-tetramethyl-2-(4,8,12-trimethyltridecyl)-2H-1-benzopyran-6-ol (which corresponds to 0.1 wt % with respect to the allyl acrylate), the reaction was carried out in the same way as in Example 1.

Ten grams of this reaction mixture was placed in a thoroughly nitrogen-purged 20 mL threaded test tube, heated to 150° C., and the thermal stability was checked. After 20 hours had elapsed, the reaction mixture remained flowable and a tendency to self-polymerize was not observed.

Example 43

Synthesis of 3-Acryloxypropyltrichlorosilane

Aside from further adding 0.1 g of 2,6-di-tert-butyl-4-methylphenol (which corresponds to 0.1 wt % with respect to the allyl acrylate), the reaction was carried out in the same way as in Example 5.

Ten grams of this reaction mixture was placed in a thoroughly nitrogen-purged 20 mL threaded test tube, heated to 150° C., and the thermal stability was checked. After 20 hours had elapsed, the reaction mixture remained flowable and a tendency to self-polymerize was not observed.

Example 44

Synthesis of 3-Acryloxypropyltrichlorosilane

Aside from further adding 0.1 g of 4,4-methylenebis(2,6-di-tert-butylphenol) (which corresponds to 0.1 wt % with respect to the allyl acrylate), the reaction was carried out in the same way as in Example 5.

Ten grams of this reaction mixture was placed in a thoroughly nitrogen-purged 20 mL threaded test tube, heated to 150° C., and the thermal stability was checked. After 20 hours had elapsed, the reaction mixture remained flowable and a tendency to self-polymerize was not observed.

Example 45

Synthesis of 3-Acryloxypropyltrichlorosilane

Aside from further adding 0.1 g of 2,2-methylenebis(6-tert-butyl-4-methylphenol) (which corresponds to 0.1 wt % with respect to the allyl acrylate), the reaction was carried out in the same way as in Example 5.

Ten grams of this reaction mixture was placed in a thoroughly nitrogen-purged 20 mL threaded test tube, heated to 150° C., and the thermal stability was checked. After 20 hours had elapsed, the reaction mixture remained flowable and a tendency to self-polymerize was not observed.

Example 46

Synthesis of 3-Acryloxvpropyltrichlorosilane

Aside from further adding 0.1 g of 2,6-di-tert-butyl-4-dimethylaminomethylphenol (which corresponds to 0.1 wt % with respect to the allyl acrylates), the reaction was carried out in the same way as in Example 5.

Ten grams of this reaction mixture was placed in a thoroughly nitrogen-purged 20 mL threaded test tube, heated to 150° C., and the thermal stability was checked. After 20 hours had elapsed, the reaction mixture remained flowable and a tendency to self-polymerize was not observed.

Example 47

Synthesis of 3-Acryloxypropyltrichlorosilane

Aside from further adding 0.1 g of 2,6-di-tert-butyl-4-methoxyphenol (which corresponds to 0.1 wt % with respect to the allyl acrylate), the reaction was carried out in is the same way as in Example 5.

Ten grams of this reaction mixture was placed in a thoroughly nitrogen-purged 20 mL threaded test tube, heated to 150° C., and the thermal stability was checked. After 20 hours had elapsed, the reaction mixture remained flowable and a tendency to self-polymerize was not observed.

Example 48

Synthesis of 3-Acryloxypropyltrichlorosilane

Aside from further adding 0.1 g of 2,6-di-test-butyl-4-hydroxyphenol (which corresponds to 0.1 wt % with respect to the allyl acrylate), the reaction was carried out in the same way as in Example 5.

Ten grams of this reaction mixture was placed in a thoroughly nitrogen-purged 20 mL threaded test tube, heated to 150° C., and the thermal stability was checked. After 20 hours had elapsed, the reaction mixture remained flowable and a tendency to self-polymerize was not observed.

Example 49

Synthesis of 3-Acryloxypropyltrichlorosilane

Aside from further adding 0.1 g of 3,4-dihydro-2,5,7,8-tetramethyl-2-(4,8,12-trimethyltridecyl)-2H-1-benzopyran-6-ol (which corresponds to 0.1 wt % with respect to the allyl acrylate), the reaction was carried out in the same way as in Example 5.

Ten grams of this reaction mixture was placed in a thoroughly nitrogen-purged 20 mL threaded test tube, heated to 150° C., and the thermal stability was checked. After 20 hours had elapsed, the reaction mixture remained flowable and a tendency to self-polymerize was to not observed.

Example 50

Synthesis of 3-Acryloxypropyitrichlorosilane

Aside from further adding 0.1 g of 2,6-di-tert-butyl-4-methylphenol (which corresponds to 0.1 wt % with respect to the allyl acrylate), the reaction was carried out in the same way as in Example 9.

Ten grams of this reaction mixture was placed in a thoroughly nitrogen-purged 20 mL threaded test tube, heated to 150° C., and the thermal stability was checked. After 20 hours had elapsed, the reaction mixture remained flowable and a tendency to self-polymerize was not observed.

Example 51

Synthesis of 3-Acryloxypropyltrichlorosilane

Aside from further adding 0.1 g of 4,4-methylenebis(2,6-di-tert-butylphenol) (which corresponds to 0.1 wt % with respect to the allyl acrylate), the reaction was carried out in the same way as in Example 9.

Ten grams of this reaction mixture was placed in a thoroughly nitrogen-purged 20 mL threaded test tube, heated to 150° C., and the thermal stability was checked. After 20 hours had elapsed, the reaction mixture remained flowable and a tendency to self-polymerize was not observed.

Example 52

Synthesis of 3-Acryloxypropyltrichlorosilane

Aside from further adding 0.1 g of 2,2-methylenebis(6-tert-butyl-4-methylphenol) (which corresponds to 0.1 wt % with respect to the allyl acrylates), the reaction was carried out in the same way as in Example 9.

Ten grams of this reaction mixture was placed in a thoroughly nitrogen-purged 20 mL threaded test tube, heated to 150° C., and the thermal stability was checked. After 20 hours had elapsed, the reaction mixture remained flowable and a tendency to self-polymerize was not observed.

Example 53

Synthesis of 3-Acryloxypropyltrichlorosilane

Aside from further adding 0.1 g of 2,6-di-tert-butyl-4-dimethylaminomethylphenol (which corresponds to 0.1 wt % with respect to the ally' acrylate), the reaction was carried out in the same way as in Example 9.

Ten grams of this reaction mixture was placed in a thoroughly nitrogen-purged 20 mL threaded test tube, heated to 150° C., and the thermal stability was checked. After 20 hours had elapsed, the reaction mixture remained flowable and a tendency to self-polymerize was not observed.

Example 54

Synthesis of 3-Acryloxypropyltrichlorosilane

Aside from further adding 0.1 g of 2,6-di-tert-butyl-4-methoxyphenol (which corresponds to 0.1 wt % with respect to the allyl acrylate), the reaction was carried out in the same way as in Example 9.

Ten grams of this reaction mixture was placed in a thoroughly nitrogen-purged 20 mL threaded test tube, heated to 150° C., and the thermal stability was checked. After 20 hours had elapsed, the reaction mixture remained flowable and a tendency to self-polymerize was not observed.

Example 55

Synthesis of 3-Acryloxypropyltrichlorosilane

Aside from further adding 0.1 g of 2,6-di-tert-butyl-4-hydroxyphenol (which corresponds to 0.1 wt % with respect to the allyl acrylate), the reaction was carried out in the same way as in Example 9.

Ten grams of this reaction mixture was placed in a thoroughly nitrogen-purged 20 mL threaded test tube, heated to 150° C., and the thermal stability was checked. After 20 hours had elapsed, the reaction mixture remained flowable and a tendency to self-polymerize was not observed.

Example 56

Synthesis of 3-Acryloxypropyltrichlorosilane

Aside from further adding 0.1 g of 3,4-dihydro-2,5,7,8-tetramethyl-2-(4,8,12-trimethyltridecyl)-2H-1-benzopyran- 6-ol (which corresponds to 0.1 wt % with respect to the allyl acrylate), the reaction was carried out in the same way as in Example 9.

Ten grams of this reaction mixture was placed in a thoroughly nitrogen-purged 20 mL threaded test tube, heated to 150° C., and the thermal stability was checked. After 20 hours had elapsed, the reaction mixture remained flowable and a tendency to self-polymerize was not observed.

Example 57

Synthesis of 3-Acryloxypropyltrichlorosilane

Aside from further adding 0.1 g of 4-methoxyphenol (which corresponds to 0.1 wt % with respect to the allyl acrylate) and 0.1 g of 2,6-di-tert-butyl-4-inethylphenol (which corresponds to 0.1 wt % with respect to the allyl acrylate), the reaction was carried out in the same way as in Example 1.

Ten grams of this reaction mixture was placed in a thoroughly nitrogen-purged 20 mL threaded test tube, heated to 150° C., and the thermal stability was checked. After 50 hours had elapsed, the reaction mixture remained tiowable and a tendency to self-polymerize was not observed.

Example 58

Synthesis of 3-Acryloxypropyltrichlorosilane

Aside from further adding 0.1 g of 4-methoxyphenol (which corresponds to 0.1 wt % with respect to the allyl acrylate) and 0.1 g of 2,.2-methylenebis((-tert-butyl-4-methylphenol) (which corresponds to 0.1 wt % with respect to the allyl a.crylate), the reaction was carried out in the same way as in Example 1.

Ten grams of this reaction mixture was placed in a. thoroughly nitrogen-purged 20 mL threaded test tube, heated to 150° C., and the thermal stability was checked. After 50 hours had elapsed, the reaction mixture remained flowable and a tendency to self-polymerize was to not observed.

Example 59

Synthesis of 3-Acryloxypropyitrichlorosilane

Aside from further adding 0.1 g of 4-tnethoxyphenol (which corresponds to 0.1 wt % with respect to the allyl acrylate) and 0.1 g of 2,6-di-tert-butyl4-dimethylaminom-ethylphenol (which corresponds to 0.1 wt % with respect to the allyl acrylate), the reaction was carried out in the same way as in Example 1.

Ten grams of this reaction mixture was placed in a thoroughly nitrogen-purged 20 mL threaded test tube, heated to 150° C., and the thermal stability was checked. After 50 hours had elapsed, the reaction mixture remained flowable and a tendency to self-polymerize was not observed.

Example 60

Synthesis of 3-Acryloxypropyltrichlorosilane

Aside from further adding 0.1 g of 4-hydroxyphenol (which corresponds to 0.1 wt % with respect to the allyl acrylate) and 0.1 g of 2,6-di-tert-butyl-4-methylphenol (which corresponds to 0.1 wt % with respect to the allyl acrylate), the reaction was carried out in the same way as in Example 1.

Ten grams of this reaction mixture was placed in a thoroughly nitrogen-purged 20 mL threaded test tube, heated to 150° C., and the thermal stability was checked. After 50 hours had elapsed, the reaction mixture remained flowable and a tendency to self-polymerize was not observed.

Example 61

Synthesis of 3-Acryloxypropyltrichlorosilane

Aside from further adding 0.1 g of 4-hydroxyphenol (which corresponds to 0.1 wt % with respect to the allyl acrylate) and 0.1 g of 2,2-methylenebis(6-tert-butyl-4-methylphenol) (which corresponds to 0.1 wt % with respect to the allyl a.crylate), the reaction was carried out in the same way as in Example 1.

Ten grams of this reaction mixture was placed in a thoroughly nitrogen-purged 20 mL threaded test tube, heated to 150° C., and the thermal stability was checked. After 50 hours had elapsed, the reaction mixture remained flowable and a tendency to self-polymerize was to not observed.

Example 62

Synthesis of 3-Acryloxypropyltrichlorosilane

Aside from further adding 0.1 g of 4-hydroxyphenol (which corresponds to 0.1 wt % with respect to the allyl acrylate) and 0.1 g of 2,6-di-tert-butyl-4-dimethylaminom-ethylphenol (which corresponds to 0.1 wt % with respect to the allyl acrylate), the reaction was carried out in the same way as in Example 1.

Ten grams of this reaction mixture was placed in a thoroughly nitrogen-purged 20 mL threaded test tube, heated to 150° C., and the thermal stability was checked. After 50 hours had elapsed, the reaction mixture remained flowable and a tendency to self-polymerize was not observed.

Example 63

Synthesis of 3-Acryloxypropyltrichlorosilane

Aside from further adding 0.1 g of 4-methoxyphenol (which corresponds to 0.1 wt % with respect to the allyl acrylate) and 0.1 g of 2,6-di-tert-butyl-4-methylphenol (which corresponds to 0.1 wt % with respect to the allyl acrylate), the reaction was carried out in the same way as in Example 5.

Ten grams of this reaction mixture was placed in a thoroughly nitrogen-purged 20 mL threaded test tube, heated to 150° C., and the thermal stability was checked. After 50 hours had elapsed, the reaction mixture remained flowable and a tendency to self-polymerize was not observed.

Example 64

Synthesis of 3-Acryloxypropyltrichlorosilane

Aside from further adding 0.1 g of 4-methoxyphenol (which corresponds to 0.1 wt % with respect to the allyl acrylate) and 0.1 g of 2,2-methylenebis(6-tert-butyl-4-methylphenol) (which corresponds to 0.1 wt % with respect to the allyl acrylate), the reaction was carried out in the same way as in Example 5.

Ten grams of this reaction mixture was placed in a thoroughly nitrogen-purged 20 mL threaded test tube, heated to 150° C., and the thermal stability was checked. After 50

Example 65

Synthesis of 3-Acryloxypropyltrichlorosilane

Aside from further adding 0.1 g of 4-tnethoxyphenol (which corresponds to 0.1 wt % with respect to the allyl acrylate) and 0.1 g of 2,6-di-tert-butyl-4-dimethylaminomethylphenol (which corresponds to 0.1 wt % with respect to the allyl acrylate), the reaction was carried out in the same way as in Example 5.

Ten grams of this reaction mixture was placed in a thoroughly nitrogen-purged 20 mL threaded test tube, heated to 150° C., and the thermal stability was checked. After 50 hours had elapsed, the reaction mixture remained flowable and a tendency to self-polymerize was not observed.

Example 66

Synthesis of 3-Acryloxypropyltrichlorosilane

Aside from further adding 0.1 g of 4-hydroxyphenol (which corresponds to 0.1 wt % with respect to the allyl acrylate) and 0.1 g of 2,6-di-tert-butyl-4-methylphenol (which corresponds to 0.1 wt % with respect to the allyl acrylate), the reaction was carried out in the same way as in Example 5.

Ten grams of this reaction mixture was placed in a thoroughly nitrogen-purged 20 mL threaded test tube, heated to 150° C., and the thermal stability was checked. After 50 hours had elapsed, the reaction mixture remained flowable and a tendency to self-polymerize was not observed.

Example 67

Synthesis of 3-Acryloxypropyltrichlorosilane

Aside from further adding 0.1 g of 4-hydroxyphenol (which corresponds to 0.1 wt % with respect to the allyl acrylate) and 0.1 g of 2,2-methylene bis(6-teat-butyl-4-methylphenol) (which corresponds to 0.1 wt % with respect to the allyl acrylate), the reaction was carried out in the same way as in Example 5.

Ten grams of this reaction mixture was placed in a. thoroughly nitrogen-purged 20 mL threaded test tube, heated to 150° C., and the thermal stability was checked. After 50 hours had elapsed, the reaction mixture remained flowable and a tendency to self-polymerize was to not observed.

Example 68

Synthesis of 3-Acryloxypropyltrichlorosilane

Aside from further adding 0.1 g of 4-hydroxyphenol (which corresponds to 0.1 wt % with respect to the allyl acrylate) and 0.1 g of 2,6-di-tert-butyl-4-dimethylaminomethylphenol (which corresponds to 0.1 wt % with respect to the allyl acrylate), the reaction was carried out in the same way as in Example 5.

Ten grams of this reaction mixture was placed in a thoroughly nitrogen-purged 20 mL threaded test tube, heated to 150° C., and the thermal stability was checked. After 50 hours had elapsed, the reaction mixture remained flowable and a tendency to self-polymerize was not observed.

Example 69

Synthesis of 3-Acryloxypropyltrichlorosilane

Aside from further adding 0.1 g of 4-methoxyphenol (which corresponds to 0.1 wt % with respect to the allyl acrylate) and 0.1 g of 2,6-di-tert-butyl-4-methylphenol (which corresponds to 0.1 wt % with respect to the allyl acrylate), the reaction was carried out in the same way as in Example 9.

Ten grams of this reaction mixture was placed in a thoroughly nitrogen-purged 20 mL threaded test tube, heated to 150° C., and the thermal stability was checked. After 50 hours had elapsed, the reaction mixture remained flowahle and a tendency to self-polymerize was not observed.

Example 70

Synthesis of 3-Acryloxypropyltrichlorosilane

Aside from further adding 0.1 g of 4-methoxyphenol (which corresponds to 0.1 wt % with respect to the allyl acrylate) and 0.1 g of 2,2-methylenebis(6-tert-butyl-4-methylphenol) (which corresponds to 0.1 wt % with respect to the allyl a.crylate), the reaction was carried out in the same way as in Example 9.

Ten grams of this reaction mixture was placed in a. thoroughly nitrogen-purged 20 mL threaded test tube, heated to 150° C., and the thermal stability was checked. After 50 hours had elapsed, the reaction mixture remained flowable and a tendency to self-polymerize was to not observed.

Example 71

Synthesis of 3-Acryloxypropyitrichlorosilane

Aside from further adding 0.1 g of 4-methoxyphenol (which corresponds to 0.1 wt % with respect to the allyl acrylate) and 0.1 g of 2,6-di-tert-butyl4-dimethylaminomethylphenol (which corresponds to 0.1 wt % with respect to the allyl acrylate), the reaction was carried out in the same way as in Example 9.

Ten grams of this reaction mixture was placed in a thoroughly nitrogen-purged 20 mL threaded test tube, heated to 150° C., and the thermal stability was checked. After 50 hours had elapsed, the reaction mixture remained flowable and a tendency to self-polymerize was not observed.

Example 72

Synthesis of 3-Acryloxypropyltrichlorosilane

Aside from further adding 0.1 g of 4-hydroxyphenol (which corresponds to 0.1 wt % with respect to the allyl acrylate) and 0.1 g of 2,6-di-tert-butyl-4-methylphenol (which corresponds to 0.1 with% with respect to the allyl acrylate), the reaction was carried out in the same way as in Example 9.

Ten grams of this reaction mixture was placed in a thoroughly nitrogen-purged 20 mL threaded test tube, heated to 150° C., and the thermal stability was checked. After 50 hours had elapsed, the reaction mixture remained flowable and a tendency to self-polymerize was not observed.

Example 73

Synthesis of 3-Acryloxypropyltrichlorosilane

Aside from further adding 0.1 g of 4-hydroxyphenol (which corresponds to 0.1 wt % with respect to the allyl hours had elapsed, the reaction mixture remained flowable and a tendency to self-polymerize was to not observed.

acrylate) and 0.1 g of 2,.2-methylenebis(6-tert-butyl-4-methylphenol) (which corresponds to 0.1 wt % with respect to the allyl acrylate), the reaction was carried out in the same way as in Example 9.

Ten grams of this reaction mixture was placed in a thoroughly nitrogen-purged 20 mL threaded test tube, heated to 150° C., and the thermal stability was checked. After 50 hours had elapsed, the reaction mixture remained flowable and a tendency to self-polymerize was to not observed.

Example 74

Synthesis of 3-Acryloxypropyltrichlorosilane

Aside from further adding 0.1 g of 4-hydroxyphenol (which corresponds to 0.1 wt % with respect to the allyl acrylate) and 0.1 g of 2,6-di-tert-butyl-4-dimethylaminomethylphenol (which corresponds to 0.1 wt % with respect to the allyl acrylate), the reaction was carried out in the same way as in Example 9.

Ten grams of this reaction mixture was placed in a thoroughly nitrogen-purged 20 mL threaded test tube, heated to 150° C., and the thermal stability was checked. After 50 hours had elapsed, the reaction mixture remained flowable and a tendency to self-polymerize was not observed.

Comparative Example 1

Allyl Acrylate Stability Test

Ten grams of allyl acrylate was placed in a thoroughly nitrogen-purged 20 mL threaded test tube, heated to 115° C., and the thermal stability was checked. After 0.1 hour had elapsed, the allyl acrylate lost flowability, self-polymerized and solidified.

Comparative Example 2

Allyl Acrylate Stability Test

Ten grams of allyl acrylate and 0.0025 g of 4-methoxyphenol (which corresponds to to 0.025 wt % with respect to the allyl acrylate) were placed in a thoroughly nitrogen-purged 20 mL threaded test tube, heated to 115° C., and the thermal stability was checked. After 7 hours had elapsed, the allyl acrylate lost flowability, self-polymerized and solidified.

Comparative Example 3

Allyl Acrylate Stability Test

Ten grams of allyl acrylate and 0.0025 g of 2,6-di-tert-butyl-4-methylphenol (which corresponds to 0.025 wt % with respect to the allyl acrylate) were placed in a thoroughly nitrogen-purged 20 mL threaded test tube, heated to 115° C., and the thermal stability was checked. After 0.1 hour had elapsed, the allyl acrylate lost flowability, self-polymerized and solidified.

Reference Example 1

Allyl Acrylate Stability Test

Ten grams of allyl acrylate and 0.0025 g of acetamide (which corresponds to 0.025 wt % with respect to the allyl acrylate) were placed in a thoroughly nitrogen-purged 20 mL threaded test tube, heated to 115° C., and the thermal stability was checked. After 30 hours had elapsed, the reaction mixture remained Plowable and a tendency to self-polymerize was not observed.

Reference Example 2

Allyl Acrylate Stability Test

Ten grams of allyl acrylate and 0.0025 g of benzamide (which corresponds to 0025 wt % with respect to the allyl acrylate) were placed in a thoroughly nitrogen-purged 20 mL threaded test tube, heated to 115° C., and the thermal stability was checked. After 30 hours had elapsed, the reaction mixture remained flowable and a tendency to self-polymerize was not observed.

Reference Example 3

Allyl Acrylate Stability Test

Ten grams of allyl acrylate and 0.0025 g of oleamide (which corresponds to 0025 wt % with respect to the allyl acrylate) were placed in a thoroughly nitrogen-purged 20 mL threaded test tithe, heated to 115° C., and the thermal stability was checked. After 30 hours had elapsed, the reaction mixture remained flowable and a tendency to self-polymerize was not observed.

Comparative Example 4

Synthesis of 3-Acryloxypropyltrichlorosilane

Aside from not using acetamide, the reaction was carried out in the same way as in Example 1. In the course of heating the system until reaching 80° C., the allyl acrylate lost flowability and, before the reaction was initiated, self-polymerized and solidified.

Comparative Example 5

Synthesis of 3-Acryloxypropyltrichlorosilane

Aside from not using acetamide, the reaction was carried out in the same way as in Example 24. After starting the dropwise addition of trichlorosilane, the reaction mixture lost flowability and, in the course of the reaction, self-polymerized and solidified.

Comparative Example 6

Synthesis of 3-Acryloxypropyltrichlorosilane

Aside from not using acetamide, the reaction was carried out in the same way as in Example 36. in the course of heating the system until reaching 80° C., the allyl acrylate lost flowability and, before the reaction was initiated, self-polymerized and solidified.

Comparative Example 7

Synthesis of 3-Acryloxypropyltrichlorosilane

Aside from not using acetamide, the reaction was carried out in the same way as to in Example 57. Following the completion of dropwise addition of trichlorosilane, the reaction mixture remained flowable and a tendency to self-polymerize was not observed.

Ten grams of this reaction mixture was placed in a thoroughly nitrogen-purged 20 mL threaded test tube, heated to 150° C., and the thermal stability was checked. After 3 hours had elapsed, the reaction mixture lost flowability, self-polymerized and solidified.

Comparative Example 8

Synthesis of 3-Acryloxypropyltrichlorosilane

Aside from not using acetamide, the reaction was carried out in the same way as in Example 58. Following the completion of dropwise addition of trichlorosilane, the reaction mixture remained flowable and a tendency to self-polymerize was not observed.

Ten grains of this reaction mixture was placed in a thoroughly nitrogen-purged 20 mL threaded test tube, heated to 150° C., and the thermal stability was checked. After 3 hours had elapsed, the reaction mixture lost flowability, self-polymerized and solidified.

Comparative Example 9

Synthesis of 3-Acryloxypropyltrichlorosilane

Aside from not using acetamide, the reaction was carried out in the same way as in Example 59. Following the completion of dropwise addition of trichlorosilane, the reaction mixture remained flowable and a tendency to self-polymerize was not observed.

Ten grams of this reaction mixture was placed in a thoroughly nitrogen-purged 20 mL threaded test tube, heated to 150° C., and the thermal stability was checked. After 3 hours had elapsed, the reaction mixture lost flowability, self-polymerized and solidified.

Comparative Example 10

Synthesis of 3-Acryloxypropyltrichlorosilane

Aside from not using acetamide, the reaction was carried out in the same way as in Example 60. Following the completion of dropwise addition of trichlorosilane, the reaction mixture remained flowable and a tendency to self-polymerize was not observed.

Ten grams of this reaction mixture was placed in a thoroughly nitrogen-purged 20 mL threaded test tube, heated to 150° C., and the thermal stability was checked. After 3 hours had elapsed, the reaction mixture lost flowability, self-polymerized and solidified.

Comparative Example 11

Synthesis of 3-Acryloxypropyltrichlorosilane

Aside from not using acetamide, the reaction was carried out in the same way as in Example 61. Following the completion of dropwise addition of trichlorosilane, the reaction mixture remained flowable and a tendency to self-polymerized was not observed.

Ten grams of this reaction mixture was placed in a thoroughly nitrogen-purged 20 mL threaded test tube, heated to 150° C., and the thermal stability was checked. After 3 hours had elapsed, the reaction mixture lost flowability, self-polymerized and solidified.

Comparative Example 12

Synthesis of 3-Acryloxypropyltrichlorosilane

Aside from not using acetamide, the reaction was carried out in the same way as in Example 62. Following the completion of dropwise addition of trichlorosilane, the reaction mixture remained flowable and a tendency to self-polymerize was not observed.

Ten grams of this mixture reaction was placed in a thoroughly nitrogen-purged 20 mL threaded test tube, heated to 150° C., and the thermal stability was checked. After 3 hours had elapsed, the reaction mixture lost flowability, self-polymerized and solidified.

TABLE 1

| | Adjuvant | Polymerization inhibitor | |
|---|---|---|---|
| | Acid amide | Phenolic | Hindered phenolic |
| Example 1 | acetamide | none | none |
| Example 2 | ↑ | ↑ | ↑ |
| Example 3 | ↑ | ↑ | ↑ |
| Example 4 | ↑ | ↑ | ↑ |
| Example 5 | benzamide | ↑ | ↑ |
| Example 6 | ↑ | ↑ | ↑ |
| Example 7 | ↑ | ↑ | ↑ |
| Example 8 | ↑ | ↑ | ↑ |
| Example 9 | oleamide | ↑ | ↑ |
| Example 10 | ↑ | ↑ | ↑ |
| Example 11 | ↑ | ↑ | ↑ |
| Example 12 | ↑ | ↑ | ↑ |
| Example 13 | N-methylacetamide | ↑ | ↑ |
| Example 14 | N,N-dimethylacetamide | ↑ | ↑ |
| Example 15 | malonamide | ↑ | ↑ |
| Example 16 | succinamide | ↑ | ↑ |
| Example 17 | maleamide | ↑ | ↑ |
| Example 18 | fumaramide | ↑ | ↑ |
| Example 19 | propionamide | ↑ | ↑ |
| Example 20 | butyramide | ↑ | ↑ |
| Example 21 | palmitamide | ↑ | ↑ |
| Example 22 | stearamide | ↑ | ↑ |
| Example 23 | erucamide | ↑ | ↑ |
| Example 24 | acetamide | 4-methoxyphenol | ↑ |
| Example 25 | ↑ | 2-methyl-4-methoxyphenol | ↑ |
| Example 26 | ↑ | 2-tert-butyl-4-methoxyphenol | ↑ |
| Example 27 | ↑ | 4-hydroxyphenol | ↑ |
| Example 28 | benzamide | 4-methoxyphenol | ↑ |
| Example 29 | ↑ | 2-methyl-4-methoxyphenol | ↑ |
| Example 30 | ↑ | 2-tert-butyl-4-methoxyphenol | ↑ |
| Example 31 | ↑ | 4-hydroxyphenol | ↑ |
| Example 32 | oleamide | 4-methoxyphenol | ↑ |

TABLE 1-continued

| | Adjuvant | Polymerization inhibitor | |
|---|---|---|---|
| | Acid amide | Phenolic | Hindered phenolic |
| Example 33 | ↑ | 2-methyl-4-methoxyphenol | ↑ |
| Example 34 | ↑ | 2-tert-butyl-4-methoxyphenol | ↑ |
| Example 35 | ↑ | 4-hydroxyphenol | ↑ |

TABLE 2

| | Adjuvant | Polymerization inhibitor | |
|---|---|---|---|
| | Acid amide | Phenolic | Hindered phenolic |
| Example 36 | acetamide | none | 2,6-di-tert-butyl-4-methylphenol |
| Example 37 | ↑ | ↑ | 4,4-methylenebis(2,6-di-tert-butylphenol) |
| Example 38 | ↑ | ↑ | 2,2-methylenebis(6-tert-butyl-4-methylphenol) |
| Example 39 | ↑ | ↑ | 2,6-di-tert-butyl-4-dimethylaminomethylphenol |
| Example 40 | ↑ | ↑ | 2,6-di-tert-butyl-4-methoxyphenol |
| Example 41 | ↑ | ↑ | 2,6-di-tert-butyl-4-hydroxyphenol |
| Example 42 | ↑ | 3,4-dihydro-2,5,7,8-tetramethyl-2-(4,8,12-trimethyltridecyl)-2H-1-benzopyran-6-ol | ↑ |
| Example 43 | benzamide | ↑ | 2,6-di-tert-butyl-4-methylphenol |
| Example 44 | ↑ | ↑ | 4,4-methylenebis(2,6-di-tert-butylphenol) |
| Example 45 | ↑ | ↑ | 2,2-methylenebis(6-tert-butyl-4-methylphenol) |
| Example 46 | ↑ | ↑ | 2,6-di-tert-butyl-4-dimethylaminomethylphenol |
| Example 47 | ↑ | ↑ | 2,6-di-tert-butyl-4-methoxyphenol |
| Example 48 | ↑ | ↑ | 2,6-di-tert-butyl-4-hydroxyphenol |
| Example 49 | ↑ | 3,4-dihydro-2,5,7,8-tetramethyl-2-(4,8,12-trimethyltridecyl)-2H-1-benzopyran-6-ol | ↑ |
| Example 50 | oleamide | ↑ | 2,6-di-tert-butyl-4-methylphenol |
| Example 51 | ↑ | ↑ | 4,4-methylenebis(2,6-di-tert-butylphenol) |
| Example 52 | ↑ | ↑ | 2,2-methylenebis(6-tert-butyl-4-methylphenol) |
| Example 53 | ↑ | ↑ | 2,6-di-tert-butyl-4-dimethylaminomethylphenol |
| Example 54 | ↑ | ↑ | 2,6-di-tert-butyl-4-methoxyphenol |
| Example 55 | ↑ | ↑ | 2,6-di-tert-butyl-4-hydroxyphenol |
| Example 56 | ↑ | 3,4-dihydro-2,5,7,8-tetramethyl-2-(4,8,12-trimethyltridecyl)-2H-1-benzopyran-6-ol | ↑ |
| Example 57 | acetamide | 4-methoxyphenol | 2,6-di-tert-butyl-4-methylphenol |
| Example 58 | ↑ | ↑ | 2,2-methylenebis(6-tert-butyl-4-methylphenol) |
| Example 59 | ↑ | ↑ | 2,6-di-tert-butyl-4-dimethylaminomethylphenol |
| Example 60 | ↑ | 4-hydroxyphenol | 2,6-di-tert-butyl-4-methylphenol |
| Example 61 | ↑ | ↑ | 2,2-methylenebis(6-tert-butyl-4-methylphenol) |
| Example 62 | ↑ | ↑ | 2,6-di-tert-butyl-4-dimethylaminomethylphenol |
| Example 63 | benzamide | 4-methoxyphenol | 2,6-di-tert-butyl-4-methylphenol |
| Example 64 | ↑ | ↑ | 2,2-methylenebis(6-tert-butyl-4-methylphenol) |
| Example 65 | ↑ | ↑ | 2,6-di-tert-butyl-4-dimethylaminomethylphenol |
| Example 66 | ↑ | 4-hydroxyphenol | 2,6-di-tert-butyl-4-methylphenol |
| Example 67 | ↑ | ↑ | 2,2-methylenebis(6-tert-butyl-4-methylphenol) |
| Example 68 | ↑ | ↑ | 2,6-di-tert-butyl-4-dimethylaminomethylphenol |
| Example 69 | oleamide | 4-methoxyphenol | 2,6-di-tert-butyl-4-methylphenol |
| Example 70 | ↑ | ↑ | 2,2-methylenebis(6-tert-butyl-4-methylphenol) |
| Example 71 | ↑ | ↑ | 2,6-di-tert-butyl-4-dimethylaminomethylphenol |
| Example 72 | ↑ | 4-hydroxyphenol | 2,6-di-tert-butyl-4-methylphenol |
| Example 73 | ↑ | ↑ | 2,2-methylenebis(6-tert-butyl-4-methylphenol) |
| Example 74 | ↑ | ↑ | 2,6-di-tert-butyl-4-dimethylaminomethylphenol |

TABLE 3

| | Adjuvant | Polymerization inhibitor | |
|---|---|---|---|
| | Acid amide | Phenolic | Hindered phenolic |
| Comparative Example 1 | none | none | none |
| Comparative Example 2 | ↑ | 4-methoxyphenol | ↑ |
| Comparative Example 3 | ↑ | none | 2,6-di-tert-butyl-4-methylphenol |
| Reference Example 1 | acetamide | ↑ | none |
| Reference Example 2 | benzamide | ↑ | ↑ |
| Reference Example 3 | oleamide | ↑ | ↑ |
| Comparative Example 4 | none | ↑ | ↑ |
| Comparative Example 5 | ↑ | 4-methoxyphenol | ↑ |

TABLE 3-continued

|  | Adjuvant | Polymerization inhibitor | |
|---|---|---|---|
|  | Acid amide | Phenolic | Hindered phenolic |
| Comparative Example 6 | ↑ | none | 2,6-di-tert-butyl-4-methylphenol |
| Comparative Example 7 | ↑ | 4-methoxyphenol | ↑ |
| Comparative Example 8 | ↑ | ↑ | 2,2-methylenebis(6-tert-butyl-4-methylphenol) |
| Comparative Example 9 | ↑ | ↑ | 2,6-di-tert-butyl-4-dimethylaminomethylphenol |
| Comparative Example 10 | ↑ | 4-hydroxyphenol | 2,6-di-tert-butyl-4-methylphenol |
| Comparative Example 11 | ↑ | ↑ | 2,2-methylenebis(6-tert-butyl-4-methylphenol) |
| Comparative Example 12 | ↑ | ↑ | 2,6-di-tert-butyl-4-dimethylaminomethylphenol |

TABLE 4

|  | Reaction stage | | |
|---|---|---|---|
|  | Before start of reaction (temperature, time) | During reaction (temperature, time) | After end of reaction (temperature, time) |
| Example 1 | stable (80° C., 2 hours) | stable (80 to 100° C., 10 hours) | stable (150° C., 5 hours) |
| Example 2 | stable (80° C., 2 hours) | stable (80 to 100° C., 10 hours) | stable (150° C., 5 hours) |
| Example 3 | stable (80° C., 2 hours) | stable (80 to 100° C., 10 hours) | stable (150° C., 5 hours) |
| Example 4 | stable (80° C., 2 hours) | stable (80 to 100° C., 10 hours) | stable (150° C., 5 hours) |
| Example 5 | stable (80° C., 2 hours) | stable (80 to 100° C., 10 hours) | stable (150° C., 5 hours) |
| Example 6 | stable (80° C., 2 hours) | stable (80 to 100° C., 10 hours) | stable (150° C., 5 hours) |
| Example 7 | stable (80° C., 2 hours) | stable (80 to 100° C., 10 hours) | stable (150° C., 5 hours) |
| Example 8 | stable (80° C., 2 hours) | stable (80 to 100° C., 10 hours) | stable (150° C., 5 hours) |
| Example 9 | stable (80° C., 2 hours) | stable (80 to 100° C., 10 hours) | stable (150° C., 5 hours) |
| Example 10 | stable (80° C., 2 hours) | stable (80 to 100° C., 10 hours) | stable (150° C., 5 hours) |
| Example 11 | stable (80° C., 2 hours) | stable (80 to 100° C., 10 hours) | stable (150° C., 5 hours) |
| Example 12 | stable (80° C., 2 hours) | stable (80 to 100° C., 10 hours) | stable (150° C., 5 hours) |
| Example 13 | stable (80° C., 2 hours) | stable (80 to 100° C., 10 hours) | stable (150° C., 5 hours) |
| Example 14 | stable (80° C., 2 hours) | stable (80 to 100° C., 10 hours) | stable (150° C., 5 hours) |
| Example 15 | stable (80° C., 2 hours) | stable (80 to 100° C., 10 hours) | stable (150° C., 5 hours) |
| Example 16 | stable (80° C., 2 hours) | stable (80 to 100° C., 10 hours) | stable (150° C., 5 hours) |
| Example 17 | stable (80° C., 2 hours) | stable (80 to 100° C., 10 hours) | stable (150° C., 5 hours) |
| Example 18 | stable (80° C., 2 hours) | stable (80 to 100° C., 10 hours) | stable (150° C., 5 hours) |
| Example 19 | stable (80° C., 2 hours) | stable (80 to 100° C., 10 hours) | stable (150° C., 5 hours) |
| Example 20 | stable (80° C., 2 hours) | stable (80 to 100° C., 10 hours) | stable (150° C., 5 hours) |
| Example 21 | stable (80° C., 2 hours) | stable (80 to 100° C., 10 hours) | stable (150° C., 5 hours) |
| Example 22 | stable (80° C., 2 hours) | stable (80 to 100° C., 10 hours) | stable (150° C., 5 hours) |
| Example 23 | stable (80° C., 2 hours) | stable (80 to 100° C., 10 hours) | stable (150° C., 5 hours) |
| Example 24 | stable (80° C., 2 hours) | stable (80 to 100° C., 10 hours) | stable (150° C., 6 hours) |
| Example 25 | stable (80° C., 2 hours) | stable (80 to 100° C., 10 hours) | stable (150° C., 6 hours) |
| Example 26 | stable (80° C., 2 hours) | stable (80 to 100° C., 10 hours) | stable (150° C., 6 hours) |
| Example 27 | stable (80° C., 2 hours) | stable (80 to 100° C., 10 hours) | stable (150° C., 6 hours) |
| Example 28 | stable (80° C., 2 hours) | stable (80 to 100° C., 10 hours) | stable (150° C., 6 hours) |
| Example 29 | stable (80° C., 2 hours) | stable (80 to 100° C., 10 hours) | stable (150° C., 6 hours) |
| Example 30 | stable (80° C., 2 hours) | stable (80 to 100° C., 10 hours) | stable (150° C., 6 hours) |
| Example 31 | stable (80° C., 2 hours) | stable (80 to 100° C., 10 hours) | stable (150° C., 6 hours) |
| Example 32 | stable (80° C., 2 hours) | stable (80 to 100° C., 10 hours) | stable (150° C., 6 hours) |
| Example 33 | stable (80° C., 2 hours) | stable (80 to 100° C., 10 hours) | stable (150° C., 6 hours) |
| Example 34 | stable (80° C., 2 hours) | stable (80 to 100° C., 10 hours) | stable (150° C., 6 hours) |
| Example 35 | stable (80° C., 2 hours) | stable (80 to 100° C., 10 hours) | stable (150° C., 6 hours) |
| Example 36 | stable (80° C., 2 hours) | stable (80 to 100° C., 10 hours) | stable (150° C., 20 hours) |
| Example 37 | stable (80° C., 2 hours) | stable (80 to 100° C., 10 hours) | stable (150° C., 20 hours) |
| Example 38 | stable (80° C., 2 hours) | stable (80 to 100° C., 10 hours) | stable (150° C., 20 hours) |
| Example 39 | stable (80° C., 2 hours) | stable (80 to 100° C., 10 hours) | stable (150° C., 20 hours) |
| Example 40 | stable (80° C., 2 hours) | stable (80 to 100° C., 10 hours) | stable (150° C., 20 hours) |
| Example 41 | stable (80° C., 2 hours) | stable (80 to 100° C., 10 hours) | stable (150° C., 20 hours) |
| Example 42 | stable (80° C., 2 hours) | stable (80 to 100° C., 10 hours) | stable (150° C., 20 hours) |
| Example 43 | stable (80° C., 2 hours) | stable (80 to 100° C., 10 hours) | stable (150° C., 20 hours) |
| Example 44 | stable (80° C., 2 hours) | stable (80 to 100° C., 10 hours) | stable (150° C., 20 hours) |
| Example 45 | stable (80° C., 2 hours) | stable (80 to 100° C., 10 hours) | stable (150° C., 20 hours) |
| Example 46 | stable (80° C., 2 hours) | stable (80 to 100° C., 10 hours) | stable (150° C., 20 hours) |
| Example 47 | stable (80° C., 2 hours) | stable (80 to 100° C., 10 hours) | stable (150° C., 20 hours) |
| Example 48 | stable (80° C., 2 hours) | stable (80 to 100° C., 10 hours) | stable (150° C., 20 hours) |
| Example 49 | stable (80° C., 2 hours) | stable (80 to 100° C., 10 hours) | stable (150° C., 20 hours) |
| Example 50 | stable (80° C., 2 hours) | stable (80 to 100° C., 10 hours) | stable (150° C., 20 hours) |
| Example 51 | stable (80° C., 2 hours) | stable (80 to 100° C., 10 hours) | stable (150° C., 20 hours) |
| Example 52 | stable (80° C., 2 hours) | stable (80 to 100° C., 10 hours) | stable (150° C., 20 hours) |
| Example 53 | stable (80° C., 2 hours) | stable (80 to 100° C., 10 hours) | stable (150° C., 20 hours) |
| Example 54 | stable (80° C., 2 hours) | stable (80 to 100° C., 10 hours) | stable (150° C., 20 hours) |
| Example 55 | stable (80° C., 2 hours) | stable (80 to 100° C., 10 hours) | stable (150° C., 20 hours) |
| Example 56 | stable (80° C., 2 hours) | stable (80 to 100° C., 10 hours) | stable (150° C., 20 hours) |
| Example 57 | stable (80° C., 2 hours) | stable (80 to 100° C., 10 hours) | stable (150° C., 50 hours) |
| Example 58 | stable (80° C., 2 hours) | stable (80 to 100° C., 10 hours) | stable (150° C., 50 hours) |

TABLE 4-continued

| | Reaction stage | | |
|---|---|---|---|
| | Before start of reaction (temperature, time) | During reaction (temperature, time) | After end of reaction (temperature, time) |
| Example 59 | stable (80° C., 2 hours) | stable (80 to 100° C., 10 hours) | stable (150° C., 50 hours) |
| Example 60 | stable (80° C., 2 hours) | stable (80 to 100° C., 10 hours) | stable (150° C., 50 hours) |
| Example 61 | stable (80° C., 2 hours) | stable (80 to 100° C., 10 hours) | stable (150° C., 50 hours) |
| Example 62 | stable (80° C., 2 hours) | stable (80 to 100° C., 10 hours) | stable (150° C., 50 hours) |
| Example 63 | stable (80° C., 2 hours) | stable (80 to 100° C., 10 hours) | stable (150° C., 50 hours) |
| Example 64 | stable (80° C., 2 hours) | stable (80 to 100° C., 10 hours) | stable (150° C., 50 hours) |
| Example 65 | stable (80° C., 2 hours) | stable (80 to 100° C., 10 hours) | stable (150° C., 50 hours) |
| Example 66 | stable (80° C., 2 hours) | stable (80 to 100° C., 10 hours) | stable (150° C., 50 hours) |
| Example 67 | stable (80° C., 2 hours) | stable (80 to 100° C., 10 hours) | stable (150° C., 50 hours) |
| Example 68 | stable (80° C., 2 hours) | stable (80 to 100° C., 10 hours) | stable (150° C., 50 hours) |
| Example 69 | stable (80° C., 2 hours) | stable (80 to 100° C., 10 hours) | stable (150° C., 50 hours) |
| Example 70 | stable (80° C., 2 hours) | stable (80 to 100° C., 10 hours) | stable (150° C., 50 hours) |
| Example 71 | stable (80° C., 2 hours) | stable (80 to 100° C., 10 hours) | stable (150° C., 50 hours) |
| Example 72 | stable (80° C., 2 hours) | stable (80 to 100° C., 10 hours) | stable (150° C., 50 hours) |
| Example 73 | stable (80° C., 2 hours) | stable (80 to 100° C., 10 hours) | stable (150° C., 50 hours) |
| Example 74 | stable (80° C., 2 hours) | stable (80 to 100° C., 10 hours) | stable (150° C., 50 hours) |

TABLE 5

| | Reaction stage | | |
|---|---|---|---|
| | Before start of reaction (temperature, time) | During reaction (temperature, time) | After end of reaction (temperature, time) |
| Comparative Example 1 | polymerized (115° C., 0.1 hour) | — | — |
| Comparative Example 2 | polymerized (115° C., 7 hours) | — | — |
| Comparative Example 3 | polymerized (115° C., 0.1 hour) | — | — |
| Reference Example 1 | stable (115° C., 30 hours) | — | — |
| Reference Example 2 | stable (115° C., 30 hours) | — | — |
| Reference Example 3 | stable (115° C., 30 hours) | — | — |
| Comparative Example 4 | polymerized (<80° C., 0.1 hour) | — | — |
| Comparative Example 5 | stable (80° C., 2 hours) | polymerized (80 to 100° C., 0.1 hour) | — |
| Comparative Example 6 | polymerized (<80° C., 0.1 hour) | — | — |
| Comparative Example 7 | stable (80° C., 2 hours) | stable (80 to 100° C., 10 hours) | polymerized (150° C., 3 hours) |
| Comparative Example 8 | stable (80° C., 2 hours) | stable (80 to 100° C., 10 hours) | polymerized (150° C., 3 hours) |
| Comparative Example 9 | stable (80° C., 2 hours) | stable (80 to 100° C., 10 hours) | polymerized (150° C., 3 hours) |
| Comparative Example 10 | stable (80° C., 2 hours) | stable (80 to 100° C., 10 hours) | polymerized (150° C., 3 hours) |
| Comparative Example 11 | stable (80° C., 2 hours) | stable (80 to 100° C., 10 hours) | polymerized (150° C., 3 hours) |
| Comparative Example 12 | stable (80° C., 2 hours) | stable (80 to 100° C., 10 hours) | polymerized (150° C., 3 hours) |

As shown in Tables 1 to 5, it is apparent that using an acid amide compound is important for the stable preparation of (meth)acryloyloxy group-containing organosilicon compounds without self-polymerization.

In Examples 1 to 23, an acid amide compound suppressed propagation reactions of the starting (meth)acrylate compound, both before the start of the reaction and during the reaction, and also suppressed propagation reactions of the (meth)acryloyloxy to group-containing organosilicon compound obtained as the product, both during the reaction and following reaction completion. As a result, it was possible to stably prepare (meth)acryloyloxy group-containing organosilicon compounds without self-polymerization. Because acid amide compounds lack a radical-trapping structure such as a hydroxyl group, they were not hitherto thought to act as polymerization inhibitors. However, acid amide compounds have tautomerism, and an acid imide compound that is a tautomerized acid amide compound has a hydroxyl group. It is thought that, because this acid imide compound has substituents with steric hindrance around the hydroxyl group, the hydroxyl group does not react with halosilane compounds. Hence, presumably, even in the presence of a halosilane compound, radicals that are generated are rapidly trapped, enabling stable production of the (meth)acryloyloxy group-containing organosilicon compound without self-polymerization.

In addition, it is apparent that the combined use of an acid amide compound and a polymerization inhibitor increases the effects more than when the respective compounds are used by alone.

In Examples 24 to 56, the (meth)acryloyloxy group-containing organosilicon compound following reaction completion became more stable owing to interactions between an acid amide compound and a phenolic polymerization inhibitor or a hindered phenolic polymerization inhibitor. In Examples 57 to 74, the (meth)acryloyloxy group-containing organosilicon compound following reaction completion became even more stable owing to interactions between an acid amide compound and both a phenolic polymerization inhibitor and a hindered phenolic polymerization inhibitor.

On the other hand, in Comparative Examples 1 to 3, in cases where an acid amide compound was not present, the effect of a phenolic polymerization inhibitor or a hindered phenolic polymerization inhibitor was inadequate and propagation reactions of the starting (meth)acrylate compound readily proceeded, as a result of which self-polymerization arose prior to the start of the reaction. By contrast, in Reference Examples 1 to 3, the acid amide compound suppressed propagation reactions of the starting (meth) acrylate compound and so self-polymerization did not arise.

In Comparative Examples 4 to 12, in cases where an acid amide compound was not present, the effects due to the phenolic polymerization inhibitor and the hindered phenolic polymerization inhibitor, when used individually or in combination, were inadequate, as a result of which self-polymerization occurred at some point during preparation ranging from before the start of the reaction up to following reaction completion.

Japanese Patent Application No. 2021-176459 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing an acryloxy or methacryloxy group-containing organosilicon compound of general formula (3) below

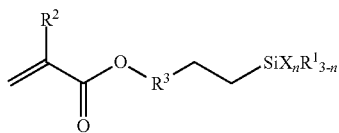

(3)

wherein $R^1$ is a substituted or unsubstituted monovalent hydrocarbon group of 1 to 10 carbon atoms, $R^2$ is a hydrogen atom or a methyl group, $R^3$ is an unsubstituted divalent hydrocarbon group of 1 to 18 carbon atoms, X is a halogen atom and n is an integer of 1, 2 or 3, which method comprises the step of subjecting a hydrohalosilane compound of general formula (1) below $$HSiX_nR^1_{3-n}$$ (1)

wherein $R^1$, X and n are as defined above and an alkenyl group-containing (meth)acrylate compound of general formula (2) below

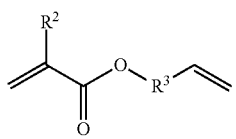

(2)

wherein $R^2$ and $R^3$ are as defined above to a hydrosilylation reaction in the presence of an acid amide compound and a platinum catalyst.

2. The method of claim 1, wherein the acid amide compound is an acid amide compound of general formula (4) below $$R^4-[C(=O)-NR^5_2]_k$$ (4)

wherein $R^4$ is a hydrogen atom or a substituted or unsubstituted k-valent hydrocarbon group of 1 to 30 carbon atoms, each $R^5$ is independently a hydrogen atom or a substituted or unsubstituted monovalent hydrocarbon group of 1 to 30 carbon atoms, and k is the integer 1 or 2, with the proviso that the acid amide compound of general formula (4) does not contain a primary acid amide compound of general formula (5) below $$R^6-C(=O)-NH_2$$ (5)

wherein $R^6$ is a hydrogen atom or a substituted or unsubstituted monovalent hydrocarbon group of 1 to 30 carbon atoms.

3. The method of claim 1, wherein the acid amide compound is one or more selected from the group consisting of acetamide, N-methylacetamide, N,N-dimethylacetamide, malonamide, succinamide, maleamide, fumaramide, benzamide, propionamide, butyramide, palmitamide, stearamide, oleamide and erucamide.

4. The method of claim 1, wherein the hydrosilylation reaction is carried out in the presence of a polymerization inhibitor.

5. The method of claim 4, wherein the polymerization inhibitor is a phenolic polymerization inhibitor or a hindered phenolic polymerization inhibitor.

6. The method of claim 5. wherein the phenolic polymerization inhibitor is one or more selected from the group consisting of 4-methoxyphenol, 2-methyl-4-methoxyphenol, 2-tert-butyl-4-methoxyphenol and 4-hydroxyphenol.

7. The method of claim 5, wherein the hindered phenolic polymerization inhibitor is one or more selected from the group consisting of 2,6-di-tert-butyl-4-methylphenol, 4,4-methylenebis(2,6-di-tert-butylphenol), 2,2-methylenebis(6-tert-butyl-4-methylphenol), 2,6-di-tert-butyl-4-dimethylaminomethylphenol, 2,6-di-tert-butyl-4-methoxyphenol, 2,6-di-tert-butyl-4-hydroxyphenol and 3,4-dihydro-2,5,7,8-tetramethyl-2-(4,8,12-trimethyltridecyl)-2H benzopyran-6-ol.

* * * * *